(12) United States Patent
Rosenberg et al.

(10) Patent No.: US 12,283,126 B2
(45) Date of Patent: *Apr. 22, 2025

(54) HUMAN-COMPUTER INTERFACE SYSTEM

(71) Applicant: Sensel, Inc., Sunnyvale, CA (US)

(72) Inventors: Ilya Daniel Rosenberg, Sunnyvale, CA (US); John Aaron Zarraga, Sunnyvale, CA (US)

(73) Assignee: Sensel, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/537,285

(22) Filed: Dec. 12, 2023

(65) Prior Publication Data

US 2024/0119755 A1   Apr. 11, 2024

Related U.S. Application Data

(63) Continuation of application No. 18/077,117, filed on Dec. 7, 2022, now Pat. No. 11,887,398, which is a continuation-in-part of application No. 17/946,931, filed on Sep. 16, 2022, now Pat. No. 12,093,458, which is a continuation of application No. 17/626,669, filed as application No.
(Continued)

(51) Int. Cl.
*G06F 3/01* (2006.01)
*G06F 3/02* (2006.01)
*G06F 3/16* (2006.01)
*G06V 40/13* (2022.01)

(52) U.S. Cl.
CPC .......... *G06V 40/1306* (2022.01); *G06F 3/016* (2013.01); *G06F 3/021* (2013.01); *G06F 3/16* (2013.01)

(58) Field of Classification Search
None
See application file for complete search history.

(56) References Cited

U.S. PATENT DOCUMENTS

| | | | |
|---|---|---|---|
| 2005/0180082 A1* | 8/2005 | Nakamura | H01H 13/85 361/139 |
| 2014/0212009 A1* | 7/2014 | Benkley, III | G06F 3/0445 382/124 |

(Continued)

*Primary Examiner* — Krishna P Neupane
(74) *Attorney, Agent, or Firm* — Run8 Patent Group, LLC; Peter Miller; Alexander Rodriquez

(57) ABSTRACT

One variation of a system includes: a substrate including an aperture and a multi-layer inductor; and a cover layer arranged over the substrate and cooperating with the aperture to define a housing. Additionally, the system includes a fingerprint reader arranged within the housing and configured to permeate through the cover layer to scan a fingerprint applied over the cover layer. A magnetic element is arranged facing the multi-layer inductor and configured to inductively couple the multi-layer inductor. The system further includes a controller configured to: read electrical values from the multi-layer inductor; and register a fingerprint input on the cover layer based on the electrical values. Additionally, the controller can: read fingerprint values from the fingerprint reader to generate a fingerprint image; and trigger a first oscillating voltage across the multi-layer inductor to oscillate the cover layer in response to the fingerprint image deviating from a target fingerprint image.

13 Claims, 11 Drawing Sheets

Related U.S. Application Data

PCT/US2021/053660 on Oct. 5, 2021, now Pat. No. 11,880,506.

(60) Provisional application No. 63/290,305, filed on Dec. 16, 2021, provisional application No. 63/088,359, filed on Oct. 6, 2020.

(56) References Cited

U.S. PATENT DOCUMENTS

2017/0076885 A1\* 3/2017 Stryker ................. G06F 3/0393
2017/0300736 A1\* 10/2017 Song ................. G06V 40/1312

\* cited by examiner

HUMAN-COMPUTER INTERFACE SYSTEM

CROSS-REFERENCE TO RELATED APPLICATIONS

This Application is a continuation of U.S. Non-Provisional application Ser. No. 18/077,117, filed on 7 Dec. 2022, which is a continuation-in-part of U.S. patent application Ser. No. 17/946,931, filed on 16 Sep. 2022, which is a continuation of U.S. patent application Ser. No. 17/626,669, filed on 12 Jan. 2022, which claims the benefit under 35 U.S.C. 371 to International Application No. PCT/US21/53660, filed on 5 Oct. 2021, which claims priority to U.S. Provisional Patent Application 63/088,359, filed on 6 Oct. 2020, each of which is incorporated in its entirety by this reference.

U.S. Non-Provisional application Ser. No. 18/077,117 also claims priority to U.S. Provisional Patent Application No. 63/290,305, filed on 16 Dec. 2021, which is incorporated in its entirety by this reference.

This application is related to U.S. patent application Ser. No. 17/367,572, filed on 5 Jul. 2021, which is incorporated in its entirety by this reference.

This application is related to U.S. patent application Ser. No. 17/191,631, filed on 3 Mar. 2021, which is incorporated in its entirety by this reference.

TECHNICAL FIELD

This invention relates generally to the field of touch sensors and more specifically to a new and useful human-computer interface system in the field of touch sensors.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
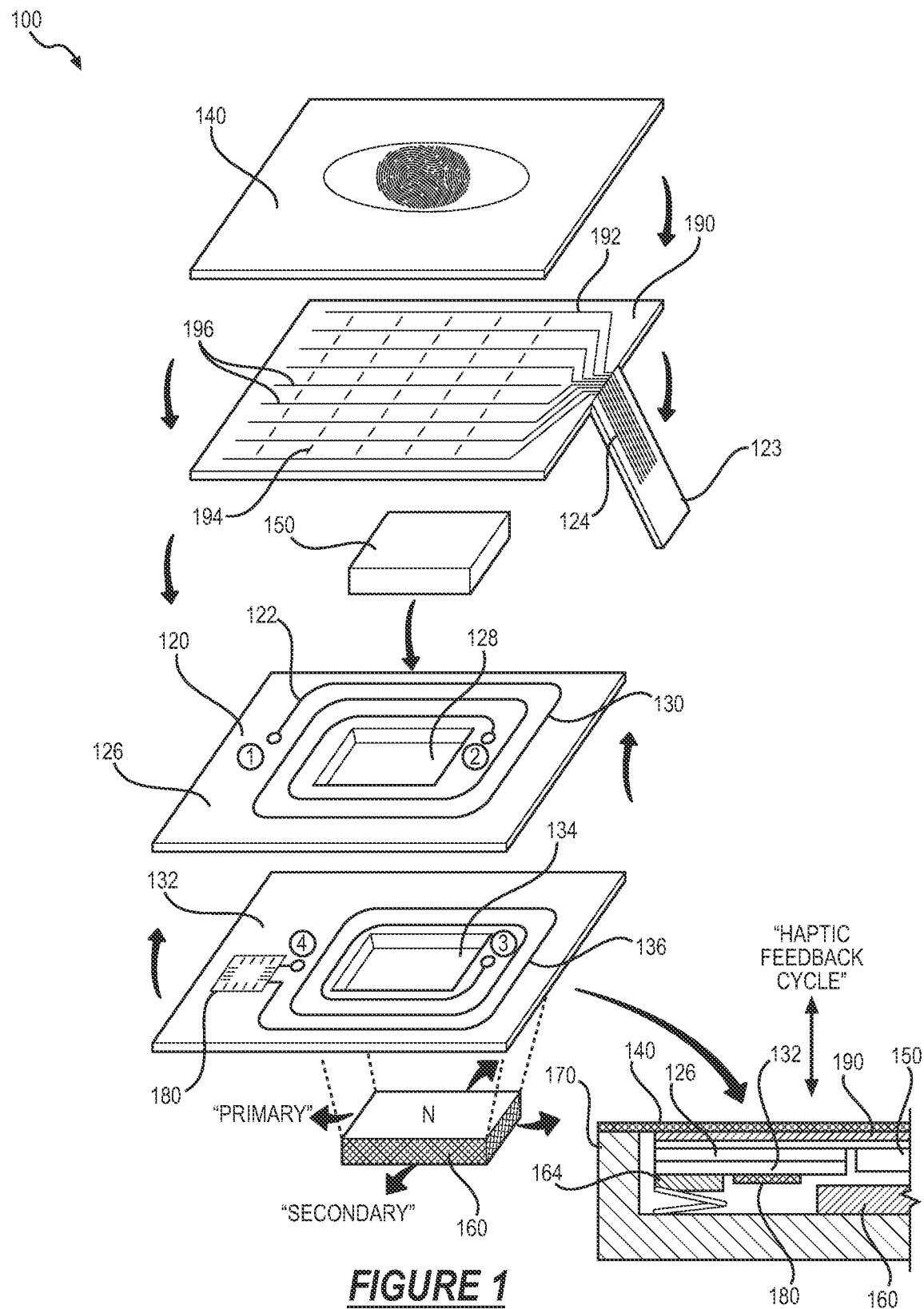
FIG. 1 is a schematic representation of a system.
Figure 2:
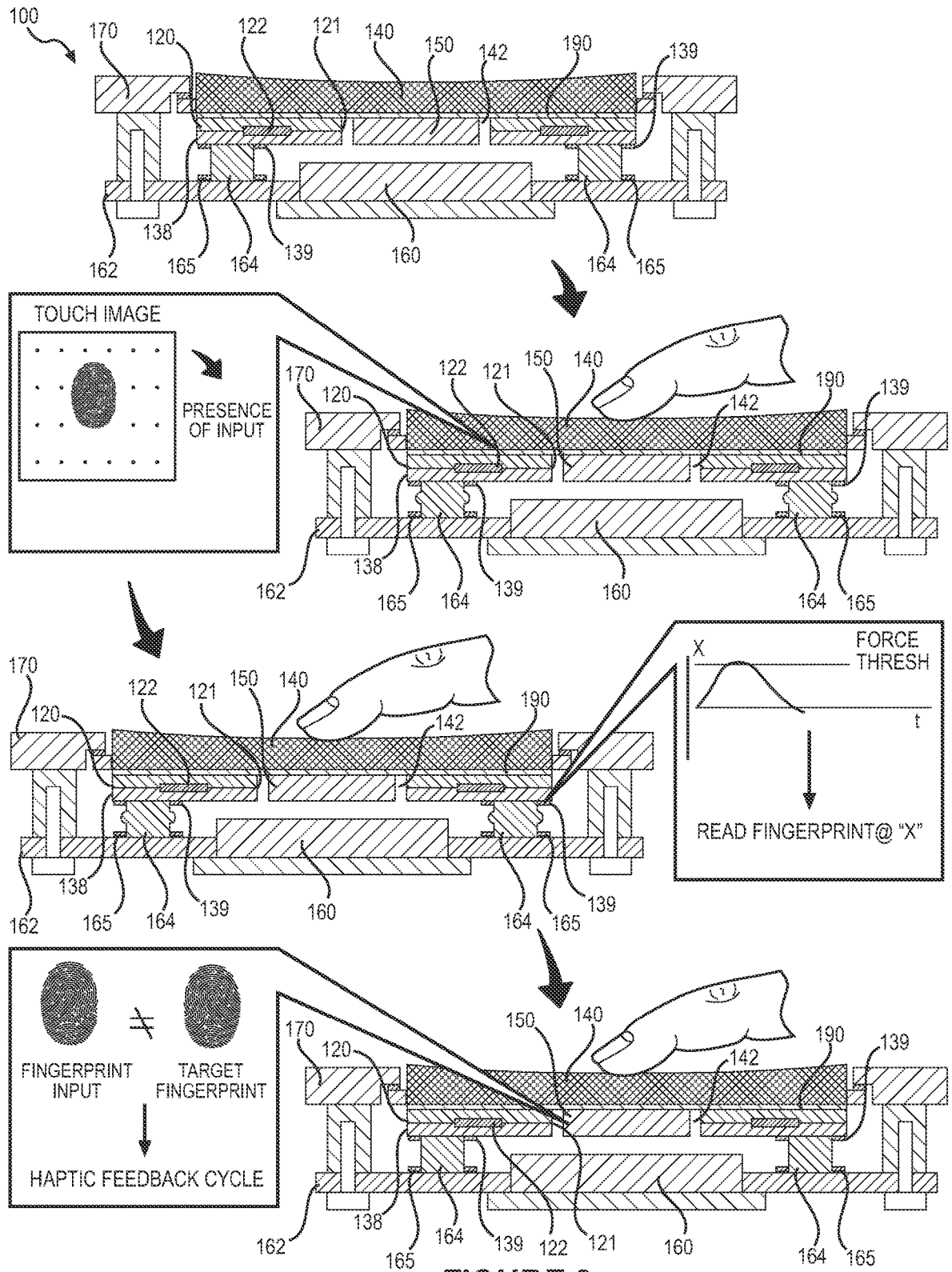
FIG. 2 is a schematic representation of one variation of the system.

As shown in FIGS. 1 and 2, a system 100 includes: a substrate 120; a cover layer 140, a fingerprint reader 150, a first magnetic element 160, and a controller 180.

The substrate 120 includes: an aperture 121 extending from a top side to a bottom side of the substrate 120; a first multi-layer inductor 122 encircling the aperture 121; and a bottom layer 138. The bottom layer 138: is arranged below the first multi-layer inductor 122; and includes a set of sensor electrodes located proximal a perimeter of the substrate 120.

The cover layer 140: is arranged over the substrate 120; and cooperates with the aperture 121 of the substrate 120 to define a housing 142.

The fingerprint reader 150: is arranged within the housing 142; and is configured to permeate through the cover layer 140 to scan a fingerprint applied over the cover layer 140.

The first magnetic element 160: defines a first polarity facing the multi-layer inductor 122; and is configured to inductively couple the first multi-layer inductor 122 responsive to application of a force on the cover layer 140.

The controller 180 is configured to: read a first set of electrical values from the set of sensor electrodes; and interpret a first force magnitude for a first fingerprint input applied on the cover layer 140 based on the first set of electrical values. Additionally, the controller 180 is configured to, at a first time, in response to the first force magnitude exceeding a target force magnitude: read a first set of fingerprint values from the fingerprint reader 150; and, in response to the first set of fingerprint values deviating from a target set of fingerprint values, trigger a first oscillating voltage across the first multi-layer inductor 122 during a first haptic feedback cycle to induce alternating magnetic coupling between the first multi-layer inductor 122 and the first magnetic element 160 and to oscillate the cover layer 140.

In one variation, as shown in FIGS. 1 and 2, a system 100 includes: a substrate 120; a cover layer 140; a touch sensor layer 190; a fingerprint reader 150; a first magnetic element 160; and a controller 180.

The substrate 120 includes: an aperture 121 extending from a top side to a bottom side of the substrate 120; and a first multi-layer inductor 122 encircling the aperture 121.

The cover layer 140 is: arranged over the substrate 120; and cooperates with the aperture 121 of the substrate 120 to define a housing 142.

The touch sensor layer 190 is: interposed between the substrate 120 and the cover layer 140; and includes a set of drive and sense electrode pairs 196 arranged across the touch sensor layer 190.

The fingerprint reader 150 is: arranged within the housing 142; and configured to permeate through the cover layer 140 and the touch sensor layer 190 to scan a fingerprint applied over the cover layer 140.

The first magnetic element 160: defines a first polarity facing the first multi-layer inductor 122; and is configured to inductively couple the first multi-layer inductor 122 responsive to application of a force on the cover layer 140.

The controller 180 is configured to read a first set of electrical values from the set of drive and sense electrode pairs 196; and, at a first time, in response to detecting presence of a first touch input on the cover layer 140 based on the first set of electrical values, read a first set of fingerprint values from the fingerprint reader 150. Furthermore, the controller 180 is configured to: generate a first fingerprint image based on the first set of fingerprint values; and, in response to the first fingerprint image deviating from a target fingerprint image, trigger a first oscillating voltage across the first multi-layer inductor 122 during a first haptic feedback cycle to induce alternating magnetic coupling between the first multi-layer inductor 122 and the first magnetic element 160 and to oscillate the cover layer 140.

2. Applications

Generally, the system 100 for human-computer interfacing includes: a touch sensor; a multi-layer inductor 122; a fingerprint reader 150; and a controller 180. The touch sensor includes: a substrate 120; an array of drive and sense electrode pairs patterned across a touch flex layer of the substrate 120; a cover layer 140 defining a touch sensor surface; and a force-sensitive layer arranged between the touch flex layer and the cover layer 140 and including material exhibiting changes in local contact resistance (and/or changes in local bulk resistance) responsive to changes in force magnitude applied to the touch sensor surface. The substrate 120 can be flexibly mounted within a receptacle (e.g., a fingerprint sensor receptacle) of a chassis 170 of a computing device to permit movement (i.e., oscillation, vibration) of the substrate 120 within the chassis 170 during a haptic feedback cycle.

The set of magnetic elements are arranged within (e.g., rigidly coupled to, bonded to) the receptacle. A set of spiral traces are fabricated within each of multiple adjacent rigid-flex layers of the substrate 120—below the touch flex layer—and are connected by vias to form a multi-layer inductor 122 arranged over the set of magnetic elements.

A set of cutouts are fabricated on each of the multiple adjacent rigid-flex layers of the substrate 120 to form a unitary cutout. The fingerprint reader 150 can be nested within the unitary cutout of substrate 120 and coupled (e.g., bonded) to the bottom surface of the touch flex layer. During a scan cycle, the controller 180: reads a first set of electrical values from the drive and sense electrode pairs; and interprets locations and force magnitudes of inputs on the touch sensor surface based on these electrical values. In response to detecting a new input—that exceeds a threshold force magnitude—on the touch sensor surface, the controller 180: outputs a command based on a location and/or force magnitude of the input; and reads a second set of electrical values from the fingerprint reader 150 to generate a fingerprint image. In response to the fingerprint image deviating from a target fingerprint image, the controller 180, selectively drives the multi-layer inductor 122 with an oscillating voltage (or oscillating current), which induces an alternating magnetic field through the multi-layer inductor 122, magnetically couples the multi-layer inductor 122 to the magnetic elements, yields an alternating force between the multi-layer inductor 122 and the magnetic elements, and thus oscillates the substrate 120 and the touch sensor surface relative to the chassis 170 of the device.

3. Substrate

In one implementation, the system 100 can include a substrate 120 that includes: a set of rigid-flex layers; and a touch flex layer arranged over the first set of rigid-flex layers. The set of rigid-flex layers can include: a set of conductive layers etched to form a set of conducted traces; a substrate 120 layer arranged below the stack of conductive layers; a set of vias that connect the set of conductive traces through the substrate 120 layers; and a set of cutouts fabricated on the set of conductive layers within the set of conducted traces to form a unitary cutout on the set of rigid-flex layers.

In particular, a top conductive layer and/or second conductive layer of the touch flex layer can include a set of traces 124 that cooperate to form an array (e.g., a grid array) of drive and sense electrode pairs within a touch sensor. Subsequent conductive layers of the set of rigid-flex layers below the touch sensor can include interconnected spiral traces that cooperate to form a single- or multi-core, single- or multi-winding, multi-layer inductor 122. Furthermore, a bottom conductive layer and/or penultimate layer of the set of rigid-flex layers can include a set of interdigitated electrodes distributed about the perimeter of the substrate 120 to form a sparse array of force sensors.

3.1 Rigid-Flex Layers & Touch Flex Layer

In one implementation, the substrate 120 includes: a set of rigid-flex layers; and a touch flex layer arranged over the set of rigid-flex layers. In this implementation, the touch flex layer can include first and second conductive layers that include columns of drive electrodes and rows of sense electrodes (or vice versa) that terminate in a grid array of drive and sense electrode pairs on a top layer of the touch flex layer. The touch flex layer can be a flexible PCB layer of a predetermined height (e.g., 100-150 um) that is arranged between the set of rigid-flex layers and the cover layer 140. In one variation of this implementation, the touch flex layer can be a single-layer flex circuit. In another variation of this implementation, the touch flex layer can be a double-sided flex circuit. In yet another variation of this implementation, the touch flex layer can be a multi-layer flex circuit. Furthermore, in this implementation, the fingerprint reader 150 can be nested within the set of rigid-flex layers and coupled (e.g., bonded by an adhesive layer) to a bottom surface of the touch flex layer. The flexibility and thickness of the touch flex layer allows for the fingerprint reader 150 to permeate through the touch flex layer and scan for fingerprint data on the touch sensor surface. The touch flex layer can be coupled to a controller 180 by way of a connector.

In one variation of this implementation, the controller 180 can be located on an external component of the system 100. In this variation, the touch flex layer can extend across a top surface of the set of rigid flex layers and extends outwardly to couple to the external component with the connector.

In another variation of this implementation, the controller 180 is located on a bottom layer 138 in the set of rigid-flex layers of the substrate 120. In this variation, the set of rigid flex-layers are wider (i.e., extends a greater surface area) than the touch flex layer. The touch flex layer can then partially extend over the top surface of the set of rigid-flex layers and then wraps around the set of rigid flex layers to be coupled to the controller 180 located in the bottom layer 138 of the set of rigid-flex layers.

The set of rigid-flex layers of the substrate 120 can be stacked together to form a PCB stack with a predetermined height (e.g., 0.5 mm) to be incorporated within a chassis 170 of a device. Furthermore, each layer in the set of rigid-flex layers, can incorporate flexible materials in conjunction with rigid materials by layering a flexible circuit substrate 120 between rigid circuit board substrate 120 layers. The multi-layer inductor 122 is integrated within the set of rigid-flex layers. The rigid-flex PCB stack provides the structural support necessary to support the conductive traces in the set of rigid-flex layers that form the multi-layer inductor 122 in the substrate 120.

Therefore, this implementation includes a substrate 120 that implements a combination of both rigid-flex layers and a touch flex layer to: provide the necessary flexibility for the fingerprint reader 150 to permeate through the top layer of the substrate 120 and the cover layer 140; and provide the necessary structural integrity to support the multi-layer inductor 122 embedded within the substrate 120.

3.2 Resistive Touch Sensor

In one implementation, the touch flex layer of the substrate 120 includes first and second conductive layers which include columns of drive electrodes and rows of sense electrodes (or vice versa) that terminate in a grid array of drive and sense electrode pairs on a top layer of the touch flex layer. In this implementation, the system 100 further includes a force sensitive layer arranged over the top conductive layer of the touch flex layer (interposed between the top layer of the touch flex layer and the cover layer 140); and exhibiting local changes in contact resistance across the set of drive and sense electrode pairs 196 responsive to local application of forces on the cover layer 140 (i.e., on the touch sensor surface.

Accordingly, during a scan cycle, the controller 180 can: serially drive the columns of drive electrodes; serially read electrode values—(e.g., voltages) representing electrical resistances across drive and sense electrode pairs—from the row of sense electrodes; detect a first input at a first location (e.g., an (x, y) location) on the touch sensor surface based on deviation of electrical values—read from a subset of drive and sense electrode pairs 196 adjacent the first location—from baseline resistance-based electrical values stored for this subset of drive and sense electrode pairs 196; and interpret a force magnitude of the first input based on a magnitude of this deviation. As described below, the controller 180 can then drive an oscillating voltage across the multi-layer inductor 122 in the substrate 120 during a haptic feedback cycle in response to the force magnitude of the first input exceeding a threshold force input.

The array of drive and sense electrode pairs on the first and second conductive layers of the touch flex layer of the substrate 120 and the force sensitive layer can thus cooperate to form a resistive touch sensor readable by the controller 180 to detect lateral positions, longitudinal positions, and force (or pressure) magnitudes of inputs (e.g., fingers, styluses, palms) on the touch sensor surface.

3.3 Capacitive Touch Sensor

In one implementation, the first and second conductive layers of the touch flex layer of the substrate 120 includes columns of drive electrodes and rows of sense electrodes (or vice versa) that terminate in a grid array of drive and sense electrode pairs on a top conductive layer of the touch flex layer.

During a scan cycle, the controller 180 can: serially drive the columns of drive electrodes; serially read electrical values (e.g., voltage, capacitance rise time, capacitance fall time, resonant frequency)—representing capacitive coupling between drive and sense electrode pairs—from the rows of sense electrodes; and detect a first input at a first location (e.g., an (x, y) location) on the touch sensor surface based on deviation of electrical values—read from a subset of drive and sense electrode pairs 196 adjacent the first location—from baseline capacitance-based electrical values stored for this subset of drive and sense electrode pairs 196. For example, the controller 180 can implement mutual capacitance techniques to read capacitance values between these drive and sense electrode pairs and interpret inputs on the touch sensor surface based on these capacitance values.

The array of drive and sense electrode pairs on the first and second conductive layers of the touch flex layer of the substrate 120 and the force-sensitive layer can thus cooperate to form a capacitive touch sensor readable by the controller 180 to detect lateral and longitudinal positions of inputs (e.g., fingers, styluses, palms) on the touch sensor surface.

In one implementation, the system 100 includes a touch sensor layer 190: interposed between the cover layer 140 and the substrate 120; including a set of drive and sense electrode pairs 196 arranged across the touch sensor layer 190; and including a tail 123 extending from the touch sensor layer 190 and including a set of traces 124 electrically coupled to the set of drive and sense electrode pairs 196. In this implementation, the touch sensor layer 190: is bonded (e.g., via a pressure sensitive adhesive) to a bottom surface of the touch sensor layer 190: and cooperates with the cover layer 140 and the substrate 120 to form the housing 142 configured to receive the fingerprint reader 150. Additionally, the tail 123: extends from a perimeter side edge of the touch sensor layer 190; and is connected to the controller 180, which can be arranged external the fingerprint reader 150 and the substrate 120 and/or arranged on the bottom surface of the substrate 120. The controller 180 can thus: read electrical values (e.g., voltage, capacitance rise time, capacitance fall time, resonant frequency)—representing capacitive coupling between drive and sense electrode pairs—from the rows of sense electrodes; and detect a first input at a first location (e.g., an (x, y) location) on the touch sensor surface based on deviation of electrical values—read from a subset of drive and sense electrode pairs 196 adjacent the first location—from baseline capacitance-based electrical values stored for this subset of drive and sense electrode pairs 196.

In one example, the system 100 includes a touch sensor layer 190: interposed between the substrate 120 and the cover layer 140; including a set of sense electrodes 192; and including a set of drive electrodes 194. The set of sense electrodes 192 is arranged across the top surface of the touch sensor layer 190. The set of drive electrodes 194 is arranged across a bottom surface of the touch sensor layer 190 and cooperates with the set of sense electrodes 192 to form an array of drive and sense electrode pairs. In this example, the system 100 can then: read a set of electrical values from the array of drive and sense electrodes pairs; detect presence of a fingerprint input on the cover layer 140 based on deviations of the set of electrical values from baseline electrical values; and, in response to detecting presence of the fingerprint input on the cover layer 140, read a set of fingerprint values from the fingerprint reader 150 arranged within the housing 142 of the substrate 120.

Therefore the system 100 can include a fingerprint reader 150 and a touch sensor layer 190 to form a touch sensor capable of: detecting presence of touch inputs applied to the cover layer 140; and scanning fingerprint data applied to the cover layer 140 in a single substrate 120 with minimal external connections.

4. Multi-Layer Inductor

The system 100 can include a multi-layer inductor 122 formed by a set of interconnected spiral traces fabricated directly within conductive layers within the substrate 120.

Generally, the total inductance of a single spiral trace may be limited by the thickness of the conductive layer. Therefore, the system 100 can include a stack of overlapping, interconnected spiral traces fabricated on a set of adjacent layers of the substrate 120 to form a multi-layer, multi-turn, and/or multi-core inductor that exhibits greater inductance—and therefore greater magnetic coupling to the set of magnetic elements—than a single spiral trace on a single conductive layer of the substrate 120. These spiral traces can be coaxially aligned about a common vertical axis (e.g., centered over the set of magnetic elements) and electrically interconnected by a set of vias through the intervening substrate 120 layers of the substrate 120.

Furthermore, the substrate 120 can include conductive layers of different thicknesses. Accordingly, spiral traces within thicker conductive layers of the substrate 120 can be fabricated with narrower trace widths and more turns, and spiral traces within thinner conductive layers of the substrate 120 can be fabricated with wider trace widths and fewer turns in order to achieve similar electrical resistances within each spiral trace over the same coil footprint. For example, lower conductive layers within the substrate 120 can include heavier layers of conductive material (e.g., one-ounce copper approximately 35 microns in thickness) in order to accommodate narrower trace widths and more turns within the coil footprint in these conductive layers, thereby increasing inductance of each spiral trace and yielding greater magnetic coupling between the multi-layer inductor 122 and the set of magnetic elements during a haptic feedback cycle. Conversely, in this example, the upper layers of the substrate 120—which include many (e.g., thousands of) drive and sense electrode pairs of the touch sensor—can include thinner layers of conductive material.

4.1 Rigid-Flex Two-Layer Inductor

In one implementation, the substrate 120 includes an even quantity of spiral traces and an even quantity of cutouts fabricated within an even quantity of two rigid-flex layers within the substrate 120 to form a substrate 120 with a single-coil inductor and a unitary aperture 121.

In one example, the system 100 includes a substrate 120 including: a first layer 126; and a second layer 132 arranged below the first layer 126. In this example, the first layer 126 includes: a first cutout 128 extending from a top side to a bottom side of the first layer 126; and a first spiral trace 130. The first spiral trace 130: is coiled in a first direction about the first cutout 128; and defines a first end and a second end. The second layer 132 includes a second cutout 134 and a second spiral trace 136. The second cutout 134: extends from a top side to a bottom side of the second layer 132; and is arranged in alignment with the first cutout 128 to define the aperture 121 of the substrate 120. The second spiral trace 136: is coiled in a second direction, opposite the first direction, about the second cutout 134; defines a third end of the second spiral trace 136 electrically coupled to the second end of the first spiral trace 130; defines a fourth end of the second spiral trace; and cooperates with the first spiral trace 130 to form the first multi-layer inductor 122 defining a primary axis and a second axis.

Therefore, the system 100 can include a substrate 120 including: an aperture 121 configured to receive a fingerprint reader 150 therein; and including a multi-layer inductor 122 arranged on the substrate 120 and encircling the aperture 121 of the substrate 120, thereby enabling the multi-layer inductor 122 and the fingerprint reader 150 to be located on the same horizontal plane.

4.2 Rigid-Flex Four-Layer Inductor

In one implementation, the substrate 120 includes an even quantity of spiral traces and an even quantity of cutouts fabricated within an even quantity of four rigid-flex layers within the substrate 120 to form a substrate 120 with a single-coil inductor and a unitary cutout.

In one example, the substrate 120 includes: a touch flex layer containing an array of drive and sense electrode pairs; a first rigid-flex layer; a second rigid-flex layer; a third rigid-flex layer; and a fourth (e.g., a bottom) rigid-flex layer. In this example, the first rigid-flex layer includes: a first spiral trace 130 coiled in a first direction and defining a first end and a second end; and a first cutout 128. In particular, the first spiral trace 130 can define a first planar coil spiraling inwardly in a clockwise direction from the first end at the periphery of the first planar coil to the second end proximal a center of the first planar coil. Furthermore, the first cutout 128 is fabricated on a center of the first planar coil, thereby forming a hooped first rigid-flex layer. The second rigid-flex layer includes: a second spiral trace 136 coiled in a second direction opposite the first direction and defining a third end—electrically coupled to the second end of the first spiral trace 130—and a further end; and a second cutout 134 in vertical alignment with the first cutout 128. In particular the second spiral trace 136 can define a second planar coil spiraling outwardly in the clockwise direction from the third end proximal the center of the second planar coil to the fourth end at a periphery of the second planar coil. Furthermore, the second cutout 134 is fabricated on a center of the second planar coil, thereby forming a hooped second rigid-flex layer in vertical alignment with the hooped first rigid-flex layer.

Similarly, the third rigid-flex layer includes: a third spiral trace coiled in the first direction and defining a fifth end—electrically coupled to the fourth end of the second spiral trace 136—and a sixth end; and a third cutout in vertical alignment with the first cutout 128 and second cutout 134. In particular, the third spiral trace can define a third planar coil spiraling inwardly in the clockwise direction from the fifth end at the periphery of the third planar coil to the sixth end proximal a center of the third planar coil. Furthermore, the third cutout is fabricated on a center of the third planar coil, thereby forming a hooped third rigid-flex layer in vertical alignment with the hooped first rigid-flex layer and the hooped second rigid-flex layer. The fourth rigid-flex layer includes: a fourth spiral trace coiled in the second direction defining a seventh end—electrically coupled to the sixth end of the first spiral trace 130—and an eighth end; and a fourth cutout in vertical alignment with the first cutout 128, second cutout 134, and third cutout. In particular, the fourth spiral trace can define a fourth planar coil spiraling outwardly in the clockwise direction from the seventh end proximal the center of the fourth planar coil to the eighth end at a periphery of the fourth planar coil.

Accordingly, the second end of the first spiral trace 130 can be coupled to the third end of the second spiral trace 136 by a first via; the fourth end of the second spiral trace 136 can be coupled to the fifth end of the third spiral trace by a second via; the sixth end of the third spiral trace can be coupled to the seventh end of the fourth spiral trace by a third via; and the first, second, third, and fourth spiral traces can cooperate to form a single-core, four-layer inductor. Additionally, each of the first cutout 128, second cutout 134, third cutout, and fourth cutout are in vertical alignment with each other to form a unitary cutout which can nest the fingerprint reader 150 therein when the each of the rigid-flex layers are stacked together.

The controller 180 (or a driver) can: can be electrically connected to the first end of the first spiral trace 130 and the eighth end of the fourth spiral trace (or "terminals" of the multi-layer inductor 122); and can drive these terminals of the multi-layer inductor 122 with an oscillating voltage during a haptic feedback cycle in order to induce an alternating magnetic field through the multi-layer inductor 122, which couples to the magnetic elements and oscillates the substrate 120 within the chassis 170. In particular, when the controller 180 drives the multi-layer inductor 122 at a first polarity, current can flow in a continuous, clockwise direction through the first, second, third, and fourth spiral traces to induce a magnetic field in a first direction around the multi-layer inductor 122. When the controller 180 reverses the polarity across terminals of the multi-layer inductor 122, current can reverse directions and flow in a continuous, counter-clockwise direction through the first, second, third, and fourth spiral traces to induce a magnetic field in a second, opposite direction at the multi-layer inductor 122.

Furthermore, in this implementation, because the multi-layer inductor 122 spans an even quantity of conductive layers within the set of rigid-flex layers, the terminals of the multi-layer inductor 122 can be located on the peripheries of the first and last layers of the substrate 120 and thus enable direct connection to the controller 180.

5. Fingerprint Reader

The system 100 includes a fingerprint reader 150: arranged within the set of rigid-flex layers (i.e., nested within the unitary cutout formed in the set of rigid-flex layers) of the substrate 120; coupled to a bottom surface of the touch flex layer (e.g., bonded by way of an adhesive layer between a top surface of the set of rigid-flex layers and the bottom surface of the touch flex layer); and configured to permeate through the touch flex layer to scan for fingerprint data on the touch sensor surface.

The fingerprint reader 150 can be arranged (i.e., nested in the unitary cutout) within the set of rigid-flex layers such that a top surface of the fingerprint reader 150 is flush with a top surface of the set of rigid-flex layers. An adhesive layer can extend over each of the top surface of the fingerprint reader 150 and the top surface of the set of rigid flex layers to bond each of the fingerprint reader 150 and the set of rigid flex layers to the bottom surface of the touch flex layer.

For example, the system 100 can include a fingerprint reader 150: arranged within the housing 142 formed by the substrate 120 and the cover layer 140; and bonded to the touch sensor layer 190 interposed between the cover layer 140 and the substrate 120. In this example, the fingerprint reader 150 permeates through the cover layer 140 and the touch sensor layer 190 in order to scan for fingerprint data applied to the cover layer 140. Furthermore, in this example, the controller 180 can be arranged on a bottom surface of the substrate 120 coupled to the fingerprint reader 150. The touch sensor layer 190 includes: a tail 123 extending from a first side of the touch sensor layer 190 that can then wrap around lateral sides of the substrate 120 to couple the controller 180 arranged at the bottom surface of the substrate 120; and includes a set of traces 124 electrically coupled to the set of drive and sense electrode pairs 196 arranged across the touch sensor layer 190.

Therefore, the system 100 can include a fingerprint reader 150: arranged within the housing 142 of the substrate 120; and bonded to a touch sensor layer 190 interposed between the cover layer 140 and the substrate 120, thereby allowing for the system 100 to detect presence of touch inputs on the cover layer 140 and scan fingerprint data responsive to detecting presence of these touch inputs on the cover layer 140.

In one variation of the system 100, the fingerprint reader 150 includes a fingerprint reader 150 controller 180 mounted on a fingerprint reader 150 PCB that is arranged on a bottom surface of the fingerprint reader 150.

In another variation of the system 100, the fingerprint reader 150 is coupled to the controller 180 (i.e., the controller 180 that drives the multi-layer inductor 122 and scans the set of sensor traces on the bottom layer 138 of the substrate 120) located on a bottom layer 138 of the substrate 120.

In yet another variation of the system 100, the controller 180 can be located in an external component of the system 100 (e.g., controller 180 for a keyboard device). The fingerprint reader 150 can couple this controller 180 via a connector.

Generally, the fingerprint controller 180 and/or system 100 controller 180 can: read a first set of electrical values from the fingerprint reader 150 for a touch input on the touch sensor surface; generate a first fingerprint image based on the first set of electrical values from the fingerprint reader 150; access a target fingerprint image from a fingerprint database stored in memory and associated with an authorized user for a device; and interpret the touch input as an "unauthorized click", in response to the first fingerprint image deviating from the target fingerprint image.

5.1 Capacitive Fingerprint Reader

In one implementation, the fingerprint reader 150 includes a capacitive fingerprint reader 150: arranged within the set of rigid-flex layers (i.e., nested within the unitary cutout formed in the set of rigid-flex layers) of the substrate 120; and coupled to a bottom surface of the touch flex layer.

For example, during operation, the controller 180 for the capacitive fingerprint reader 150 can: read a first set of capacitance values from the fingerprint reader 150 for a touch input on the touch sensor surface; detect a first set of ridges for the touch input based on the first set of capacitance values; detect a first set of valleys for the touch input based on the first set of capacitance values; generate a first capacitance image for the touch input defining a first fingerprint based on the first set of ridges and the first set of valleys; access a target capacitance image defining a target fingerprint associated with a user for a device; and compare the first capacitance image with the target capacitance image to interpret an authorization status of the touch input detected on the touch sensor surface.

5.2 Optical Fingerprint Reader

In one implementation, the fingerprint reader 150 includes an optical fingerprint reader 150: arranged within the set of rigid-flex layers (i.e., nested within the unitary cutout formed in the set of rigid-flex layers) of the substrate 120; and coupled to a bottom surface of the touch flex layer. In this implementation, the touch flex layer is formed of a translucent material thereby allowing light emitted from the optical fingerprint reader to permeate through the touch flex layer. Furthermore, the optical fingerprint reader 150 includes: a light source configured to emit light on the touch sensor surface; and a light-sensitive microchip configured to generate a digital image for a touch input on the touch sensor surface.

5.3 Ultrasonic Fingerprint Reader

In one implementation, the fingerprint reader includes an ultrasonic fingerprint reader 150: arranged below the cover layer of the substrate 120; and coupled to a bottom layer of the substrate 120. The system 100 can then, in response to detecting a touch input on the touch sensor surface, trigger the fingerprint reader 150 to emit ultrasonic pulses that permeate through the substrate 120. Thus, the ultrasonic pulses are reflected from the input applied over the touch sensor surface back to the fingerprint reader 150 below the substrate 120. The system 100 can then: read a set of reflected ultrasonic pulses from the fingerprint reader 150; generate a fingerprint image based on the set of reflected ultrasonic pulses read from the fingerprint reader 150; and trigger a haptic feedback cycle in response to the fingerprint image deviating from a target fingerprint image.

6. Magnetic Element

Generally, the system 100 includes a set of magnetic elements: rigidly coupled to the chassis 170 beneath the multi-layer inductor 122; and configured to magnetically couple to the multi-layer inductor 122 during a haptic feedback cycle, thereby applying an oscillating force to the multi-layer inductor 122 and oscillating the substrate 120—and therefore the touch sensor surface—within the receptacle during this haptic feedback cycle.

In particular, the spiral traces within the multi-layer inductor 122 can span a coil footprint, such as a rectangular or ellipsoidal footprint including: long sides parallel to a primary axis of the multi-layer inductor 122; and short sides parallel to a secondary axis of the multi-layer inductor 122. For example: the substrate 120 can be 5 inches in width and 3 inches in length; the touch sensor surface can span an area approximately 5 inches by 3 inches over the substrate 120; and the coil footprint of each single-core multi-layer inductor 122 within the substrate 120 can be approximately 1.5 inches in length and 0.5 inches in width with the primary axis of the single-core multi-layer inductor 122 extending laterally across the width of the substrate 120.

6.1 Vertical Oscillation

In one implementation, the first magnetic element 160 is arranged relative the multi-layer inductor 122 in order to induce an oscillating force—between the multi-layer inductor 122 and the first magnetic element 160—normal to the touch sensor surface such that the substrate 120 oscillates vertically within the chassis 170 during a haptic feedback cycle.

In this implementation, the system 100 can include the first magnetic element 160: arranged within the chassis 170 of a mobile device; and defining a first magnetic polarity facing the multi-layer inductor 122, approximately centered under the multi-layer inductor 122, and extending laterally across the primary axis of the multi-layer inductor 122. The first magnetic element 160 can thus generate a magnetic field that extends predominantly vertically toward the multi-layer inductor 122 and that is approximately centered under the multi-layer inductor 122. More specifically, the first magnetic element 160 can generate a magnetic field that extends predominantly normal the substrate 120 proximal the center of the multi-layer inductor 122. The controller 180 can then drive the multi-layer inductor 122 to a positive voltage during a haptic feedback cycle, and the multi-layer inductor 122 can generate a magnetic field that extends vertically through the substrate 120 in a first vertical direction, which: repels the first magnetic element 160 (arranged with the first polarity facing the multi-layer inductor 122); and yields a first vertical force in a first vertical direction. When the controller 180 then reverses the voltage across the multi-layer inductor 122 during this haptic feedback cycle, the multi-layer inductor 122 can generate a magnetic field that extends vertically through the substrate 120 in a second, opposite vertical direction. The magnetic field is configured to: attract the first magnetic element 160; yield a second vertical force in a second, opposite vertical direction; and draws the substrate 120 downward and back toward the first magnetic element 160.

Therefore, by oscillating the polarity of the multi-layer inductor 122, the controller 180 can: induce oscillating interactions (i.e., alternating attractive and repelling forces) normal to the substrate 120 between the multi-layer inductor 122 and the first magnetic element 160; and thus oscillate the substrate 120—and therefore the cover layer 140—vertically (e.g., normal to the middle frame and the rear frame of the chassis 170).

6.2 Horizontal Oscillation

In another implementation, as described above, the system 100 can be configured for horizontal oscillations of the cover layer 140 by exchanging the first magnetic element 160 that spans the width of and is centered under the multi-layer inductor 122 for a pair of opposing magnetic elements arranged under the multi-layer inductor 122, and on each of the primary axis of the multi-layer inductor 122.

In this implementation, the system 100 can include a first magnetic element 160: arranged within the chassis 170 of the mobile device; defining a first magnetic polarity facing the multi-layer inductor 122; and extending along a first side of the primary axis. In this implementation, the system 100 can similarly include a second magnetic element 167: arranged within the chassis 170 of the mobile device; defining a second magnetic polarity facing the multi-layer inductor 122; and extending along a second side of the primary axis adjacent the first magnetic element 160. In particular, the first magnetic element 160 can be arranged immediately adjacent the second magnetic element 167. The first and second magnetic elements 167 can be arranged directly under the multi-layer inductor 122 and can face the multi-layer inductor 122 with opposing polarities. When the controller 180 drives the multi-layer inductor 122 with an alternating voltage (or current), the multi-layer inductor 122 can generate a magnetic field that extends vertically through the substrate 120 (e.g., normal to the substrate 120) and interacts with the opposing magnetic fields of the first and second magnetic elements 167. More specifically, when the controller 180 drives the multi-layer inductor 122 to a positive voltage during a haptic feedback cycle, the multi-layer inductor 122 can generate a magnetic field that extends vertically through the substrate 120 in a first vertical direction, which: attracts the first magnetic element 160 (arranged with the first polarity facing the multi-layer inductor 122); repels the second magnetic element 167 (arranged with the second polarity facing the multi-layer inductor 122); yields a first lateral force in a first lateral direction; and shifts the substrate 120 laterally in the first lateral direction. When the controller 180 then reverses the voltage across the multi-layer inductor 122 during this haptic feedback cycle, the multi-layer inductor 122 can generate a magnetic field that extends vertically through the substrate 120 in the opposing vertical direction, which: repels the first magnetic element 160; attracts the second magnetic element 167; yields a second lateral force in a second, opposite lateral direction; and shifts the substrate 120 laterally in the second lateral direction.

Therefore, by oscillating the polarity of the multi-layer inductor 122, the controller 180 can: induce oscillating interactions (i.e., alternating attractive and repelling forces)—parallel to the substrate 120—between the multi-layer inductor 122 and the magnetic elements; and thus oscillate the substrate 120 and the cover layer 140 horizontally.

7. Unitary Substrate

In one implementation, the system 100 includes a unitary substrate 120 in which a multi-layer inductor 122, a fingerprint reader 150, and the touch flex layer are each coupled to a single controller 180 integrated into a bottom layer 138 of the substrate 120. This implementation combines these components to a single controller 180 to reduce the number of electrical connections in the system 100.

For example, the system 100 includes: a substrate 120; a multilayer inductor; a fingerprint reader 150; and a controller 180. The substrate 120 includes: a set of rigid-flex layers; and a touch flex layer arranged over a top surface of the set of rigid-flex layers. The set of rigid-flex layers includes: a cutout for each layer in vertical alignment with each other to form a unitary cutout when the rigid-flex layers are stacked together; and a bottom layer 138 including a controller 180 and a sparce set of force sensor traces coupled to the controller 180. The touch flex layer: is arranged over the set of rigid-flex layers; wraps around the set of rigid-flex layers to couple to the controller 180 in the bottom layer 138; and includes an array of drive and sense electrode pairs. The multi-layer inductor 122: is integrated into the set of rigid-flex layers; includes a set of spiral traces fabricated on layers in the set of rigid-flex layers; and is coupled to the controller 180 on the bottom layer 138 of the substrate 120. The fingerprint reader 150: is nested within the unitary cutout formed in the set of rigid-flex layers; is arranged underneath the touch flex layer of the substrate 120; and is coupled to the controller 180 on the bottom layer 138 of the substrate 120. The controller 180 can: detect application of an input on the touch sensor surface based on changes in electrical (e.g., capacitance or resistance, etc.) values between drive and sense electrode pairs in the touch sensor integrated into the touch flex layer of the substrate 120; read a set of electrical values (e.g., capacitance values) from the fingerprint reader 150 to generate a fingerprint image for the input on the touch sensor surface based on the set of electrical values; and execute a haptic feedback cycle, such as by transiently polarizing the multi-layer inductor 122 and the set of magnetic elements and thus vibrating the substrate 120 within the chassis 170, serving haptic feedback to a user, and providing the user with tactile perception of downward travel of the touch sensor analogous to depression of a mechanical momentary switch, button, or key.

8. Chassis Integration

As described above, the substrate 120 is flexibly mounted to the chassis 170 (e.g., within or over a receptacle defined by the chassis 170) to enable the substrate 120 to oscillate horizontally or vertically relative to the chassis 170 during a haptic feedback cycle.

8.1 Deflection Spacers

In one implementation, the system 100 includes: the top layer of the substrate 120 including an array of drive and sense electrode pairs arranged in a grid array, at a first density, and in a mutual capacitance configuration; and a bottom layer 138 of the substrate 120 including a second set of sensor traces (e.g., a sparse perimeter array of interdigitated drive and sense electrode pairs) located proximal a perimeter of the substrate 120 at a second density less than the first density. In this implementation, the system 100 further includes a set of spacer elements 164 (e.g., short elastic columns or buttons, adhesive films) coupled to the bottom layer 138 of the substrate 120 over each sensor trace and configured to support the substrate 120 on the chassis 170 of the device. In particular, each deflection spacer can include a force-sensitive layer: arranged across a sensor trace in the second set of sensor traces; and exhibiting changes in contact resistance across the sensor trace responsive to a load on the touch sensor surface that compresses the deflection space against the substrate 120.

Accordingly, in this implementation, the controller 180 can: read a first set of electrical values—representing capacitive coupling between drive and sense electrode pairs—from the set of drive and sense electrode pairs 196; and detect a first input at a first location on the touch sensor surface based on deviation of electrical values—read from a subset of drive and sense electrode pairs 196 adjacent the first location—from baseline capacitance values stored for this subset of drive and sense electrode pairs 196. During this same scan cycle, the controller 180 can also: read a second set of electrical values (e.g., electrical resistances)—representing compression of the set of spacer elements 164 against the second set of sensor traces—from the second set of sensor traces; interpret a force magnitude of the first input based on magnitudes of deviations of electrical (e.g., resistance) values from baseline electrical values across the set of sensor traces; and drive an oscillating voltage across the multi-layer inductor 122 during a haptic feedback cycle in response to the force magnitude of the first input exceeding a threshold input force.

Generally, in this configuration, the set of spacer elements 164: are interposed between the bottom layer 138 of the substrate 120 and the base of the receptacle; and vertically support the substrate 120 within the receptacle.

In one implementation, each deflection spacer includes a coupon: bonded to the bottom face of the substrate 120 and to the base of the receptacle; and formed in a low-durometer or elastic material that deflects laterally (or "shears") to enable the substrate 120 to translate laterally within the receptacle responsive to alternating magnetic coupling between the multi-layer inductor 122 and the set of magnetic elements during a haptic feedback cycle. In another implementation, each deflection spacer includes: a coupon bonded to the bottom face of the substrate 120; and a bottom face coated or including a low-friction material configured to slide across the base of the receptacle to enable the substrate 120 to translate laterally in the receptacle during a haptic feedback cycle while also vertically supporting the substrate 120 over the receptacle. In yet another implementation and as described below, each deflection spacer is mounted to a spring or flexure element—which is mounted to the chassis 170—that enables the deflection spacer to move laterally within the receptacle while vertically supporting the substrate 120 within the receptacle.

In this configuration, the bottom conductive layer of the substrate 120 can include a pair of interdigitated drive and sense electrodes in each deflection spacer location about the perimeter of the substrate 120. Furthermore, each deflection spacer can include a layer of force-sensitive material—such as described above—facing the pair of interdigitated drive and sense electrodes at this deflection spacer location on the substrate 120. The controller 180 can thus: read an electrical resistance (or a voltage representing electrical resistance) across a pair of sensor traces at a deflection spacer location; and transform this resistance into a force magnitude carried from the touch sensor surface, into the substrate 120, and into the adjacent the deflection spacer. In particular, the system 100 can include multiple deflection spacers, and the controller 180 can: read electrical values from sensor traces at each deflection spacer location; convert these electrical values into force magnitudes carried by each deflection spacer; and aggregate these force magnitudes into a total force magnitude of an input on the touch sensor surface.

Therefore, in this configuration, the substrate 120 can define a unitary structure including a dense array of drive and sense electrode pairs that form a touch sensor, a column of spiral traces that form a multi-layer inductor 122, and a sparse array of drive and sense electrode pairs that form a set of force sensors that support the substrate 120 on the chassis 170.

8.1.1 Capacitive Deflection Spacer

Alternatively, the bottom layer 138 of the substrate 120 can include a sparse array of sensor traces (e.g., interdigitated drive and sense electrode pairs) arranged in a capacitive sensing configuration at each deflection spacer location such that each of these sensor traces capacitively couples: to the chassis 170; to the adjacent deflection spacer; to a spring element supporting the substrate 120 at this deflection spacer location; or to another fixed metallic element at this deflection spacer location. Accordingly, during a scan cycle, the controller 180 can: read capacitance values from the sensor traces at these deflection spacer locations; convert these capacitance values into force magnitudes carried by each deflection spacer during the scan cycle; and aggregate these force magnitudes into a total force magnitude of an input on the touch sensor surface.

8.1.2 Inductor Integration with Deflection Spacers

Furthermore, in this configuration, the multi-layer inductor 122 can be integrated into a region of the substrate 120 offset from the deflection spacer locations (i.e., inset from regions of the substrate 120 occupied by sensor traces in these deflection spacer locations). For example, the array of deflection spacers can be located proximal a perimeter of the substrate 120, and the spiral traces that form the multi-layer inductor 122 can be arranged near a lateral and longitudinal center of the substrate 120 in order to limit injection of electrical noise from the multi-layer inductor 122 into sensor traces in these deflection spacers during a haptic feedback cycle.

In another example, the system 100 includes a set of spacer elements 164 coupling the substrate 120 to a baseplate 162 arranged below the substrate 120. In this example, each spacer element in the set of spacer elements 164: is arranged over a spacer location, in a set of spacer locations, on a bottom surface of the substrate 120; is coupled to a top surface of the baseplate 162; and supports the substrate 120 over the baseplate 162. The set of spacer elements 164 are configured to: compress during application of the first fingerprint input on the cover layer 140; and yield to oscillation of the substrate 120, responsive to the first oscillating voltage across the first multi-layer inductor 122, during the first haptic feedback cycle.

8.1.3 Thru-Mode Capacitive Deflection Spacer

In one implementation, the system 100 can include: a substrate 120 including a set of force sense electrodes 139 arranged across a bottom surface of the substrate 120; and a baseplate 162 including a set of force drive electrodes 165 configured to capacitively couple the set of force sense electrodes 139 of the substrate 120 to form an array of capacitive force sensors below the substrate 120. The controller 180 can thus: read electrical values from the array of capacitive force sensors; interpret a force magnitude applied on the cover layer 140 based on these electrical values; and trigger haptic feedback cycles in response to interpreting the force magnitude exceeding a target force magnitude.

8.1.3.1 Substrate+Force Sense Electrodes

In one implementation, the system 100 includes the substrate 120 including: a top layer; and a bottom layer 138 that defines a set of support locations. The substrate 120 further includes a set of force sense electrodes 139 arranged across a bottom layer 138 of the substrate 120 and adjacent (e.g., encircling, abutting) the support locations. The set of force sense electrodes 139 can be printed across the bottom layer 138 of the substrate 120 and/or can be integrated into a rigid or flexible PCB that is layered over the bottom layer 138 of the substrate 120.

In this implementation, the system 100 includes: each support location, in the set of support locations, arranged about a perimeter of the bottom layer 138 of the substrate 120; and the set of force sense electrodes 139 arranged across the bottom layer 138 adjacent the support locations. Additionally, the bottom layer 138 of the substrate 120: is arranged below the second layer 132 of the substrate 120, opposite the first layer 126; and includes a cutout in alignment with the cutout of the first layer 126 and the second layer 132 to define the aperture 121 of the substrate 120.

For example, the set of support locations can include: a first subset of support locations arranged proximal corner edges of the bottom layer 138 of the substrate 120; and a second subset of support locations arranged proximal lateral side edges of the bottom layer 138 of the substrate 120 between the corner edges. In this example, each sense electrode, in the set of force sense electrodes 139: can be arranged adjacent a first side of a support location, in the set of support locations; and can define a shape encircling the support location—such as a semi-circular shape (e.g., horseshoe shape, crescent shape) encircling the support location—on the first side of the support locations.

Additionally or alternatively in this example, force sense electrodes in the set of force sense electrodes 139 can be arranged: proximal the lateral side edges of the bottom layer 138 of the substrate 120 abutting the set of support locations about the perimeter of the bottom layer 138 of the substrate 120; and/or proximal a center of the bottom layer 138 of the substrate 120 abutting support locations about the center of the bottom layer 138 of the substrate 120. In particular, the force sense electrodes can extend partially about a first lateral side edge of the bottom layer 138 of the substrate 120, and/or can be arranged proximal a corner edge of the bottom layer 138 of the substrate 120 abutting the set of support locations about the perimeter of the bottom layer 138 of the substrate 120.

The system 100 can therefore: accommodate sense electrodes of varying shapes and sizes on the bottom layer 138 of the substrate 120 to maintain uniformity across the substrate 120; and reduce sensitivity to noise during scan cycles—by the controller 180—to read capacitance values from the set of sense electrodes 192 on the bottom layer 138 of the substrate 120.

8.1.2.2 Force Drive Electrodes

In one implementation, the system 100 includes a set of force drive electrodes 165 arranged below the substrate 120, such as arranged on a baseplate 162 vertically aligned to the set of force sense electrodes 139 on the bottom layer 138 of the substrate 120. In this implementation, the baseplate 162 is: arranged below the substrate 120; and spans the bottom layer 138 of the substrate 120.

In one example, the set of force drive electrodes 165 includes a conductive trace—such as formed from conductive ink (e.g., Ag, C, Cu, etc.), conductive polymers (e.g., PEDOT:PSS), patternable conductive material (e.g., graphene, ITO, metal mesh), and/or rolled annealed metal—across the top layer of the baseplate 162 and aligned with the set of force sense electrodes 139 on the bottom layer 138 of the substrate 120. In this example, the set of force drive electrodes 165 can be printed directly across the top layer of the baseplate 162 and/or can be integrated into a rigid or flexible PCB layered over the top layer of the baseplate 162. Thus, in this example, each force drive electrodes can define a segment of the conductive trace—such as a continuous trace across the baseplate 162—configured to align with the set of force sense electrodes 139 across the bottom layer 138 of the substrate 120 in order to define the array of capacitive force sensors.

Therefore, the system 100 can: drive the set of force drive electrodes 165—such as by a target voltage (e.g., 6 volts), over a target time interval, and/or with an alternating voltage at a particular frequency—across the top layer of the baseplate 162; and read a set of capacitance values—from the force sense electrodes across the bottom layer 138 of the substrate 120 aligned with the set of force drive electrodes 165—that represent measures of mutual capacitance in the array of capacitance force electrodes. As a result, the system 100 can increase the signal-to-noise ratio—such as by implementing drive voltages less than 6 volts—from the capacitance values read from the capacitance force sensors to interpret accurate magnitudes of force inputs applied to the touch sensor surface.

8.2 Spring-Loaded Chassis Interface

In one implementation, the system 100 can include a chassis interface: configured to mount to the chassis 170 of the device; and defining a set of spring elements coupled to the substrate 120 (e.g., via a set of spacer elements 164) and configured to deflect out of the plane of the chassis interface responsive to an input on the touch sensor surface and/or responsive to actuation of the multi-layer inductor 122 during a haptic feedback cycle.

In this implementation, the chassis 170 of the computing device can include a chassis 170 receptacle defining a depth approximating (or slightly more than) the thickness of a set of spacer elements 164 (e.g., 1.2-millimeter chassis 170 receptacle depth for 1.0-millimeter-thick deflection spacers). The deflection spacers are bonded to the chassis interface at each spring element. The chassis interface can then be rigidly mounted to the chassis 170 over the receptacle, such as via a set of threaded fasteners or an adhesive. The substrate 120 and the set of spacer elements 164 may thus transfer a force—applied to the touch sensor surface—into these spring elements, which deflect inwardly below a plane of the chassis interface and into the chassis 170 receptacle.

(In the configuration described above in which the substrate 120 includes sensors traces at these deflection spacer locations, each spacer is also compressed between the substrate 120 and the adjacent spring element when a force is applied to the touch sensor surface and therefore exhibits a change in its local contact resistance across the adjacent sensor trace proportional to the force carried into the adjacent spring element. The controller 180 can therefore read electrical values (e.g., a resistances) across these sensor traces and convert these electrical values into portion of the input force carried by each sensor trace.)

8.3 Spring Elements and Chassis Interface

In similar variations, the system 100 includes a set of spacer elements 164, wherein each deflection spacer in the set is arranged over a discrete deflection spacer location—in a set of discrete deflection spacer locations—on a bottom surface (e.g., the bottom layer 138) of the substrate 120 below. The system 100 can further include an array of spring elements: that couple the set of spacer elements 164 to the chassis 170 of the computing device; supporting the substrate 120 on the chassis 170; and configured to yield to oscillation of the substrate 120 (e.g., vertically or horizontally) responsive to an oscillating voltage driven across the multi-layer inductor 122 by the controller 180 during a haptic feedback cycle.

In one implementation, the system 100 includes a chassis interface defining a unitary metallic structure: arranged between the substrate 120 and the chassis 170; that defines an aperture 121 below the multi-layer inductor 122; and that comprises a set of flexures arranged about the aperture 121 and defining the array of spring elements (e.g., flexures). In this implementation, the system 100 can also include a magnetic yoke arranged in the aperture 121 of the unitary metallic structure; and the first magnetic element 160 and the second magnetic element 167 can be arranged on the magnetic yoke below the multi-layer inductor 122. Accordingly, the magnetic yoke can limit a permeability path for magnetic field lines between the rear faces of the first and second magnetic element 167s opposite the substrate 120.

In another implementation, the chassis interface and spring elements define a unitary structure (e.g., a "spring plate"). In one example, the chassis interface includes a thin-walled structure (e.g., a stainless steel 20-gage, or 0.8-millimeter-thick sheet) that is punched, etched, or laser-cut to form a flexure aligned to each support location. Thus, in this example, each spring element can define a flexure—such as a multi-arm spiral flexure—configured to laterally and longitudinally locate the system 100 over the chassis 170 and configured to deflect inwardly and outwardly from a nominal plane defined by the thin-walled structure.

More specifically, in this example, the chassis interface can include a unitary metallic sheet structure arranged between the substrate 120 and the chassis 170 and defining a nominal plane. Each spring element: can be formed (e.g., fabricated) in the unitary metallic structure; can include a flexure fabricated in the unitary metallic structure; and can be configured to return to approximately the nominal plane in response to absence of a touch input applied to the touch sensor surface.

9. Seamless Fingerprint Sensor

In one implementation, the system 100 functions as a touch sensor integrated into a chassis 170 of a device to combine features of touch detection, fingerprint detection, and haptics integration into a single module.

For example, the system 100 includes: a substrate 120; a fingerprint reader 150; a chassis 170; a first magnetic element 160; and a controller 180. The substrate 120 includes: a set of rigid-flex layers; and a touch flex layer arranged over the set of rigid-flex layers. The set of rigid-flex layers includes a set of cutouts in vertical alignment with each other to form a unitary cutout when the rigid-flex layers are stacked together. The touch flex layer includes an array of drive and sense electrode pairs. The fingerprint reader 150 is arranged: within the unitary cutout formed in the set of rigid-flex layers; and below the touch flex layer. The chassis 170 includes: a bottom portion; and a cover layer 140 arranged over the touch flex layer and supported on the bottom portion. The first magnetic element 160 is coupled to the bottom portion of the chassis 170 by way of a bracket and defines a first polarity facing the multi-layer inductor 122. The controller 180 can: read a first set of electrical values from the set of drive and sense electrode pairs 196; detect a first input on the touch sensor surface based on the first set of electrical values; in response to detecting the first input, read a second set of electrical values from the fingerprint reader 150; interpret a fingerprint image based on the second set of electrical values; and, in response to the fingerprint image deviating from a target fingerprint image, drive an oscillating voltage across the multi-layer inductor 122 to induce an alternating magnetic coupling between the multi-layer inductor 122 and the first magnetic element 160 and oscillate the substrate 120 and the cover layer 140 relative to the chassis 170.

10. Modularized Fingerprint Sensor

In one implementation, the system 100 functions as a touch sensor integrated into a chassis 170 of a device to combine features of touch detection, force detection, fingerprint detection, and haptics integration into a single module.

For example, the system 100 includes: a substrate 120; a fingerprint reader 150; a chassis 170; a set of spacer elements 164; a first magnetic element 160; and a controller 180. The substrate 120 includes: a set of rigid-flex layers; and a touch flex layer arranged over the set of rigid-flex layers. The set of rigid-flex layers includes: a set of cutouts in vertical alignment with each other to form a unitary cutout when the rigid-flex layers are stacked together; and a bottom layer 138 including a sparce array of sensor traces located proximal a perimeter of a bottom surface of the bottom layer 138. The touch flex layer includes an array of drive and sense electrode pairs. The fingerprint reader 150 is arranged: within the unitary cutout formed in the set of rigid-flex layers; and below the touch flex layer. The chassis 170 includes: a bottom portion; a cover layer 140 arranged over the touch flex layer; and a set of support structures extending upwardly from the bottom portion supporting the cover layer 140 and each including a gasket coupling to the cover layer 140. The set of spacer elements 164 are coupled to the set of sensor traces and supports the substrate 120 on the bottom portion of the chassis 170. The first magnetic element 160 is coupled to the bottom portion of the chassis 170 by way of a bracket and defines a first polarity facing the multi-layer inductor 122. The controller 180 can: read a first set of electrical values from the set of sensor traces; interpret a force magnitude of a first input on the touch sensor surface based on the first set of electrical values; in response to detecting the force magnitude exceeding a threshold force, read a second set of electrical values from the fingerprint reader 150; interpret a fingerprint image based on the second set of electrical values; and, in response to the fingerprint image deviating from a target fingerprint image, drive an oscillating voltage across the multi-layer inductor 122 to induce an alternating magnetic coupling between the multi-layer inductor 122 and the first magnetic element 160 and oscillate the substrate 120 and the cover layer 140 relative to the chassis 170.

11. Single Fingerprint Sensor

The system 100 can function as a single fingerprint sensor with haptic feedback integration. Additionally, system 100 can be configured to provide horizontal or vertical haptic feedback.

In one implementation, the system 100 can include: a chassis 170, a fingerprint reader 150, a PCB stack, a multi-layer inductor 122, a foam layer 175, a magnetic element, and a controller 180. The chassis 170 can include: a cavity defined by a bottom end and sidewalls; and a pressure sensitive adhesive arranged on the bottom end of the cavity. The magnetic element is arranged over the pressure sensitive adhesive. The foam layer 175 is arranged over the magnetic element. The PCB stack includes a set of layers and is arranged over the foam layer 175. The multi-layer inductor 122: is integrated into the set of layers; includes a set of spiral traces fabricated on the set of layers; and is coupled to the controller 180. The fingerprint reader 150 can be arranged over the PCB and coupled to the controller 180. The controller 180 can: detect a first input on the fingerprint reader 150; read a set of electrical values from the fingerprint reader 150; interpret a fingerprint image based on the set of electrical values; and in response to the fingerprint image deviating from a target fingerprint image, drive an oscillating voltage across the multi-layer inductor 122 to induce an alternating magnetic coupling between the multi-layer inductor 122 and first magnetic element 160 and oscillate a cover layer 140.

In one example, the system 100 includes a chassis 170 including: a set of sidewalls 172; and a base 174 arranged below the set of sidewalls 172 and defining a cavity. In this example, the first magnetic element 160: is arranged within the cavity: and bonded (e.g., via a pressure sensitive adhesive) to the base 174 of the chassis 170. Additionally, the substrate 120: is arranged over the first magnetic element 160 within the cavity of the chassis 170; and is set flush with a top side of the set of sidewalls 172. Furthermore, the system 100 includes a foam layer 175: interposed between the substrate 120 and the first magnetic element 160 within the cavity of the chassis 170; and is configured to compress during application of the first fingerprint input on the cover layer 140 and yield displacement of the substrate 120 toward the chassis 170 element during application of the first fingerprint input, thereby affecting capacitance values in the array of capacitance force sensors arranged on the bottom layer 138 of the substrate 120.

11.1 Separate Force Sensor

In another implementation, a force sensor is arranged over the multi-layer inductor 122 of the PCB stack. The controller 180 can: detect a first input on the fingerprint reader 150; read a set of electrical values from the fingerprint reader 150; read a set of force values from the force sensor; interpret a fingerprint image based on the set of electrical values; interpret a force magnitude from the set of force values; and in response to the fingerprint image deviating from a target fingerprint image and the force magnitude exceeding a force threshold, drive an oscillating voltage across the multi-layer inductor 122 to induce an alternating magnetic coupling between the multi-layer inductor 122 and first magnetic element 160 and oscillate a cover layer 140.

11.2 Separate Multi-Layer Inductor

In yet another implementation, the multi-layer inductor 122 can be integrated as a separate entity from the PCB stack. For example, the fingerprint reader 150 can be arranged on a PCB stack arranged within the cavity of the chassis 170. In this example, the substrate 120: is arranged below the PCB stack; spans an area less than the PCB stack; and includes the multi-layer inductor 122. Additionally, the substrate 120 can include a foam material enveloping open regions of the substrate 120 below the PCB stack.

11.3 Rigid Multi-Layer Inductor

In yet another implementation, the substrate 120 including the multilayer inductor can be arranged (i.e., bonded) to the base 174 of the chassis 170 via a pressure sensitive adhesive. Additionally, the first magnetic element 160 is interposed between the PCB stack and the substrate 120. This implementation exchanges the structural location of the inductor and the first magnetic element 160 in the system 100 to reduce production cost.

11.4 Foam Seal

In yet another implementation, the system 100 can include a cover layer 140 arranged about the top side of the set of sidewalls 172 of the chassis 170. In this implementation, the system 100 includes a foam seal layer interposed between the fingerprint reader 150 and the cover layer 140 about the edge of the sidewalls. The foam seal layer is configured to prevent dust and other particles from entering the chassis 170.

11.5 Illumination

In yet another implementation, the system 100 can include a light guide arranged above the fingerprint reader 150 and configured to provide optical feedback to a user. The controller 180 can: detect a first input on the fingerprint reader 150; read a set of electrical values from the fingerprint reader 150; and interpret a fingerprint image based on the set of electrical values. Additionally, in response to the fingerprint image deviating from a target fingerprint image, the system can: drive an oscillating voltage across the multi-layer inductor 122 to induce an alternating magnetic coupling between the multi-layer inductor 122 and the first magnetic element 160 and oscillate a cover layer 140; and actuate the light guide to flash a first particular color in a first pattern for a first time period.

In one example, the system 100 includes a cover layer 140: arranged over the substrate 120; and including a translucent region spanning the aperture 121 of the substrate 120. In this example, the fingerprint reader 150 is bonded (e.g., by way of a pressure sensitive adhesive) to the translucent region within the housing 142 formed by the substrate 120 and the cover layer 140. Furthermore, the multi-layer inductor 122 defines a spiral trace: fabricated on a first layer 126 of the substrate 120 facing the cover layer 140; encircling a first cutout 128 fabricated on the first layer 126 of the substrate 120; and facing the first translucent region of the cover layer 140. The system 100 further includes a light element 177: arranged on the first layer 126 of the substrate 120 adjacent the first spiral trace 130 of the first multi-layer inductor 122; facing the first translucent region; and configured to illuminate the first translucent region.

Thus, the system 100 can, in response to the fingerprint image deviating from a target fingerprint image, trigger an oscillating voltage across the first multi-layer inductor 122 during a first haptic feedback cycle; and trigger a second voltage across the first light element 177 during the first haptic feedback cycle to illuminate the first translucent region at a first intensity.

11.6 Audible Feedback

In yet another implementation, the multi-layer inductor 122 and the first magnetic element 160 of the system 100 can be configured to function as a speaker in order to broadcast audible feedback responsive to magnetic coupling between the multi-layer inductor 122 and the first magnetic element 160. The controller 180 can drive concurrent oscillating voltage signals to the multi-layer inductor 122 to: oscillate the substrate 120 during a haptic feedback cycle; and generate an audible tone during the haptic feedback cycle.

In one example, the system 100 can: generate a fingerprint image from fingerprint values read from the fingerprint reader 150; and, in response to the fingerprint image deviating from the target fingerprint image, trigger a first oscillating voltage at a first frequency (e.g., 20 Hz) across the first multi-layer inductor 122 during the first haptic feedback cycle to induce alternating magnetic coupling between the first multi-layer inductor 122 and the first magnetic element 160 and to oscillate the cover layer 140. Concurrently, the system 100 can trigger a second oscillating voltage at a second frequency (e.g., 2.5 k Hz), greater than the first frequency (i.e., at a perceivable audible frequency), concurrent the first oscillating voltage during the first haptic feedback cycle to induce alternating magnetic coupling between the first multi-layer inductor 122 and the first magnetic element 160 and to broadcast an audible feedback tone from the speaker.

11.7 Keyboard Integration

In yet another implementation, the system 100 can be integrated into a keyboard device (e.g., qwerty keyboard, number pad, remote control, etc.). In this implementation, the system 100 can be arranged above the plane of a C-deck and can function as an input key in a set of input keys for the keyboard.

In this implementation, the system 100 includes: a keyboard chassis 152; a substrate 120; a tactile layer; an array of magnetic elements 155; and a controller 180. The substrate 120 includes an array of inductors 153 and is arranged within the keyboard chassis 152. The tactile layer: is arranged over the substrate 120; and defines an array of key locations 154 over the array of inductors 153. Each magnetic element in the array of magnetic elements 155: is arranged at a key location in the array of key locations 154; is configured to inductively couple to an adjacent inductor in the array of inductors 153; and is configured to move relative to the adjacent inductor responsive to application of a force on the tactile layer at the key location. The controller 180 is configured to read electrical values from the array of inductors 153. The controller 180 is further configured to, at a first time and in response to detecting a first change in electrical value at a first inductor, in the array of inductors 153: register a first keystroke of a first key type associated with a first key location, in the array of key locations 154, defined over the first inductor; and drive an oscillating voltage across the first inductor during a first haptic feedback cycle to a) induce alternating magnetic coupling between the first inductor and a first magnetic element 160, in the array of magnetic elements 155, arranged within the tactile layer at the first key location and b) oscillate the tactile layer, at the first key location, relative to the substrate 120.

Additionally, the tactile layer can define a fingerprint reader 150 location over a particular inductor of the substrate 120. In this implementation, the substrate 120 includes the particular inductor encircling an aperture 121 extending through a top side and a bottom side of the substrate 120. The tactile layer cooperates with the aperture 121 of the substrate 120 to form a housing 142 at the fingerprint reader 150 location. The fingerprint reader 150: is arranged within the housing 142; and bonded to the tactile layer at the fingerprint reader 150 location. Thus, the system 100 can, responsive to registering a keystroke at the fingerprint reader 150 location: read fingerprint values from the fingerprint reader 150; generate a fingerprint image based on these fingerprint values; and trigger haptic feedback cycles responsive to deviations of the fingerprint image from a target fingerprint image.

12. Controller

In one implementation, during operation, the controller 180 can: detect application of an input on the touch sensor surface based on changes in electrical (e.g., capacitance or resistance, etc.) values between drive and sense electrode pairs in the touch sensor integrated into the touch flex layer of the substrate 120; characterize a force magnitude of the input based on these electrical values read from the touch sensor and/or based on electrical values read from the sensor traces in the deflection spacers integrated into the bottom layer 138 of the substrate 120; and/or interpret the input as a "click" input if the force magnitude of the input exceeds a threshold force magnitude (e.g., 160 grams). Then, in response to detecting the input and/or interpreting the input as a "click" input, the controller 180 can then execute a haptic feedback cycle, such as by transiently polarizing the multi-layer inductor 122 and the set of magnetic elements and thus vibrating the substrate 120 within the chassis 170, serving haptic feedback to a user, and providing the user with tactile perception of downward travel of the touch sensor analogous to depression of a mechanical momentary switch, button, or key.

In another implementation, during operation, the controller 180 can: access a target fingerprint image from a database of fingerprint images corresponding to fingerprint data of an authorized user for a device; read a set of electrical values (e.g., capacitance values) from the fingerprint reader 150; generate a first fingerprint image based on the set of electrical values collected from the fingerprint reader 150; and interpret the first fingerprint image as belonging to an unauthorized user if the first fingerprint image deviates from the target fingerprint image. Then, in response to detecting the first fingerprint image and/or interpreting the first fingerprint image as belonging to the unauthorized user, the controller 180 can execute a haptic feedback cycle, such as by transiently polarizing the multi-layer inductor 122 and the set of magnetic elements and thus vibrating the substrate 120 within the chassis 170, serving haptic feedback to a user, and providing the user with tactile perception of downward travel of the touch sensor analogous to depression of a mechanical momentary switch, button, or key.

In yet another implementation, during operation, the controller 180 can: detect application of an input on the touch sensor surface based on changes in electrical (e.g., capacitance or resistance, etc.) values between drive and sense electrode pairs in the touch sensor integrated into the touch flex layer of the substrate 120; characterize a force magnitude of the input based on these electrical values read from the touch sensor and/or based on electrical values read from the sensor traces in the deflection spacers integrated into the bottom layer 138 of the substrate 120; read a set of electrical values (e.g., capacitance values) from the fingerprint reader 150 in response to the force magnitude of the input exceeding a threshold force magnitude (e.g., 160 grams); generate a first fingerprint image for the input based on the set of electrical values collected from the fingerprint reader 150; access a target fingerprint image from a database of fingerprint images corresponding to fingerprint data of an authorized user for a device; and interpret the input as belonging to an unauthorized user if the first fingerprint image deviates from the target fingerprint image. Then, in response to detecting the input and/or interpreting the input as belonging to the unauthorized user, the controller 180 can execute a haptic feedback cycle, such as by transiently polarizing the multi-layer inductor 122 and the set of magnetic elements and thus vibrating the substrate 120 within the chassis 170, serving haptic feedback to a user, and providing the user with tactile perception of downward travel of the touch sensor analogous to depression of a mechanical momentary switch, button, or key.

In yet another implementation, during operation, the controller 180 can: detect application of an input on the touch sensor surface based on changes in electrical (e.g., current) values in the multi-layer inductor 122 integrated into the rigid-flex layers of the substrate 120; read a set of electrical values (e.g., capacitance values) from the fingerprint reader 150 in response to detecting presence of electrical values from the multi-layer inductor 122; generate a first fingerprint image for the input based on the set of electrical values collected from the fingerprint reader 150; access a target fingerprint image from a database of fingerprint images corresponding to fingerprint data of an authorized user for a device; and interpret the input as belonging to an unauthorized user if the first fingerprint image deviates from the target fingerprint image. Then, in response to detecting the input and/or interpreting the input as belonging to the unauthorized user, the controller 180 can execute a haptic feedback cycle, such as by transiently polarizing the multi-layer inductor 122 and the set of magnetic elements and thus vibrating the substrate 120 within the chassis 170, serving haptic feedback to a user, and providing the user with tactile perception of downward travel of the touch sensor analogous to depression of a mechanical momentary switch, button, or key.

13. Haptic Feedback Cycle

Generally, the system 100 can include the multi-layer inductor 122—integrated into the substrate 120—and the set of magnetic elements—housed within the chassis 170 below the multi-layer inductor 122—cooperating to define a compact, integrated multi-layer inductor 122 configured to oscillate the substrate 120 and the touch sensor surface responsive to polarization of the multi-layer inductor 122 by the controller 180 (e.g., in response detecting touch inputs on the touch sensor surface). More specifically, the controller 180, in conjunction with a drive circuit, can supply an alternating (i.e., time-varying) drive current to the multi-layer inductor 122 during a haptic feedback cycle, thereby generating a time-varying magnetic field through the multi-layer inductor 122 that periodically reverses direction. Thus, the controller 180 and/or the drive circuit can transiently polarize the multi-layer inductor 122 to generate magnetic forces between the multi-layer inductor 122 and the set of magnetic elements, thereby causing the multi-layer inductor 122 (and thus the substrate 120 and touch sensor surface) to be alternately attracted and repelled by poles of the set of magnetic elements and oscillating the touch sensor surface relative to the chassis 170.

In particular, in response to interpreting an authorization status for a touch input the touch sensor surface, the controller 180 can drive the multi-layer inductor 122 during a "haptic feedback cycle" in order to tactilely mimic action of a mechanical snap button depending on the authorization status for the touch input.

For example, in response to interpreting an unauthorized status for a touch input on the touch sensor surface, the controller 180 can trigger a motor driver to drive the multi-layer inductor 122 with a first oscillating voltage (e.g., a square-wave alternating voltage) for a predetermined duration of time (e.g., 250 milliseconds), thereby inducing an alternating magnetic field through the multi-layer inductor 122, which magnetically couples to the set of magnetic elements, induces an oscillating force of a first type between the magnetic element and the multi-layer inductor 122, and oscillates the substrate 120 relative to the chassis 170.

In another example, in response to interpreting an authorized status for a touch input on the touch sensor surface, the controller 180 can trigger a motor driver to drive the multi-layer inductor 122 with a second oscillating voltage (e.g., a square-wave alternating voltage) different from the first oscillating voltage for a predetermined duration of time (e.g., 250 milliseconds), thereby inducing an alternating magnetic field through the multi-layer inductor 122, which magnetically couples to the set of magnetic elements, induces an oscillating force of a second type between the magnetic element and the multi-layer inductor 122, and oscillates the substrate 120 relative to the chassis 170.

14. Variation: Inductive Sensing

Figure 3:
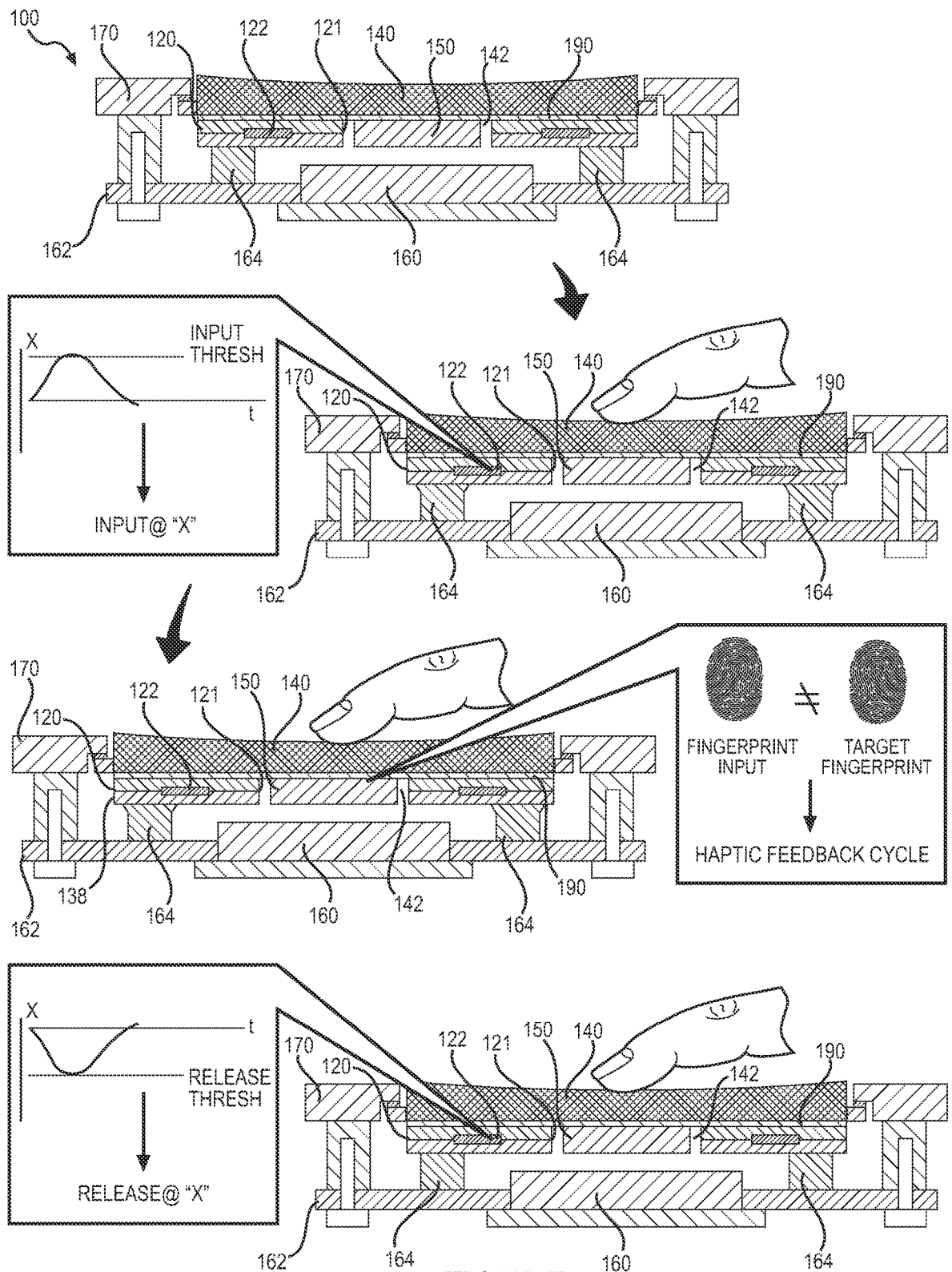
FIG. 3 is a schematic representation of another variation of the system.
Figure 4A:
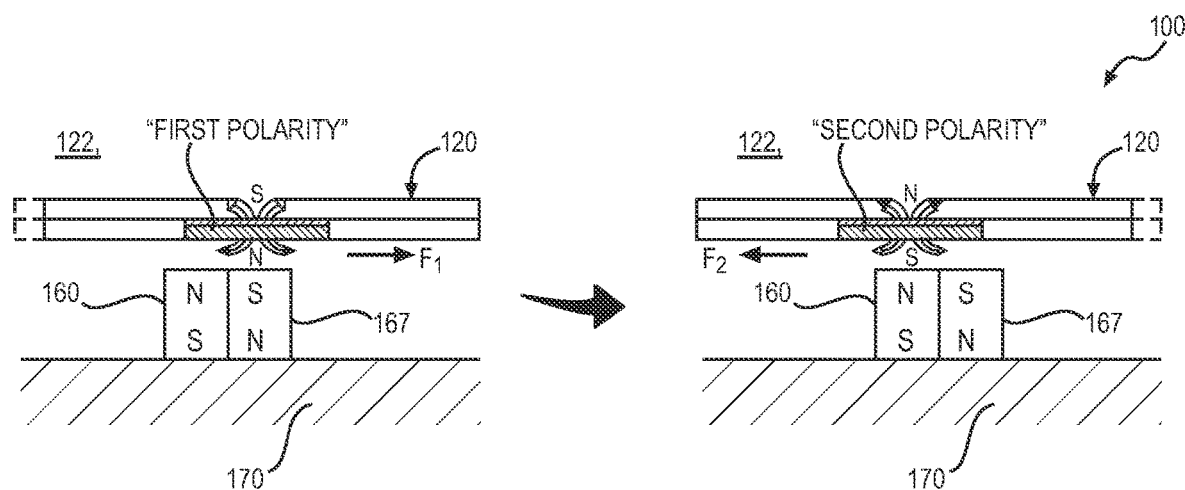
FIGS. 4A and 4B are a schematic representation of another variation of the system.
Figure 4B:
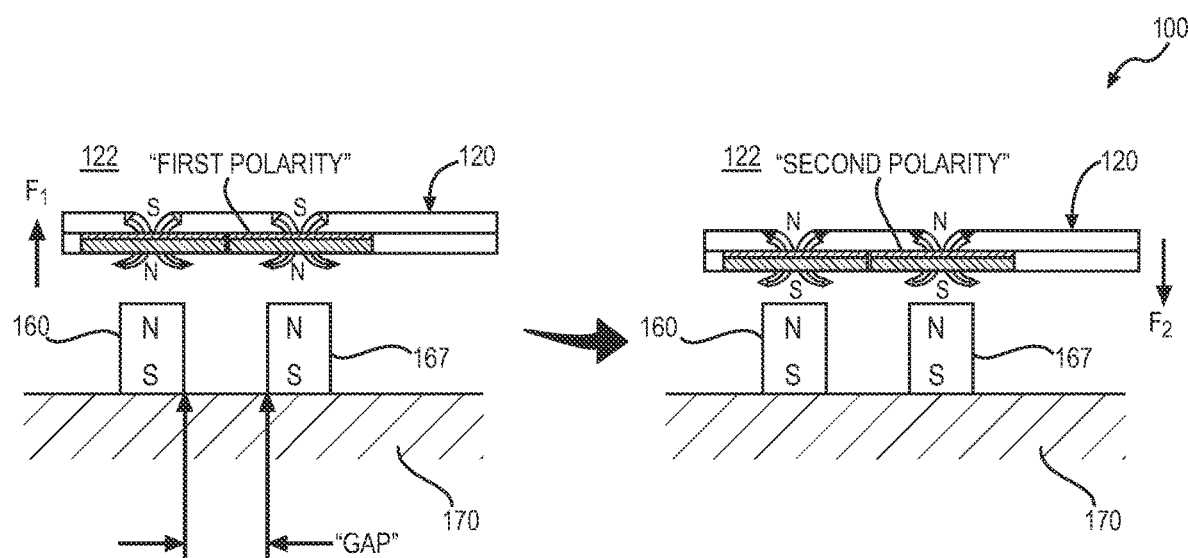
Figure 5:
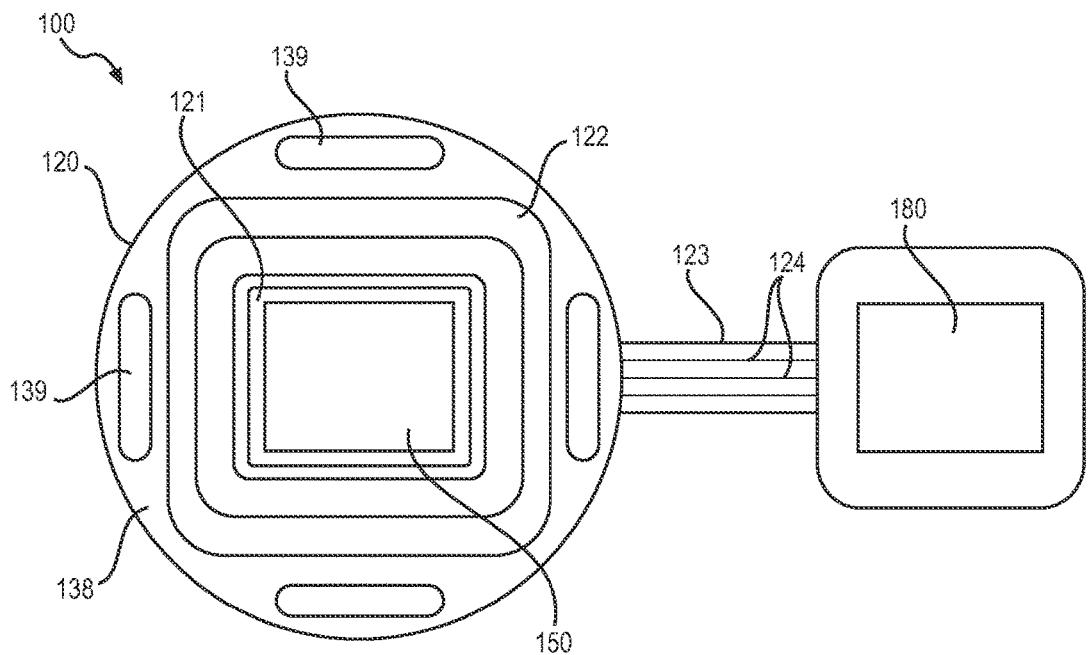
FIG. 5 is a schematic representation of another variation of the system.
Figure 6:
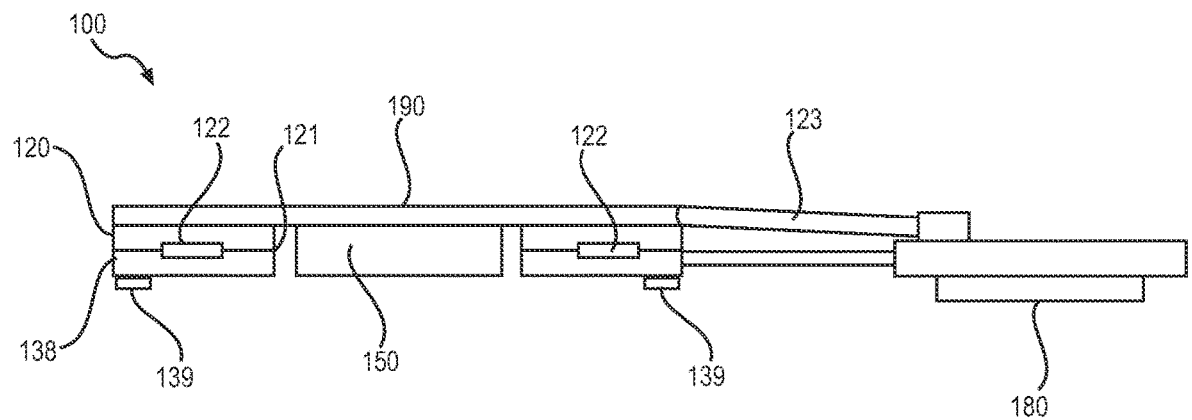
FIG. 6 is a schematic representation of another variation of the system.
Figure 7:
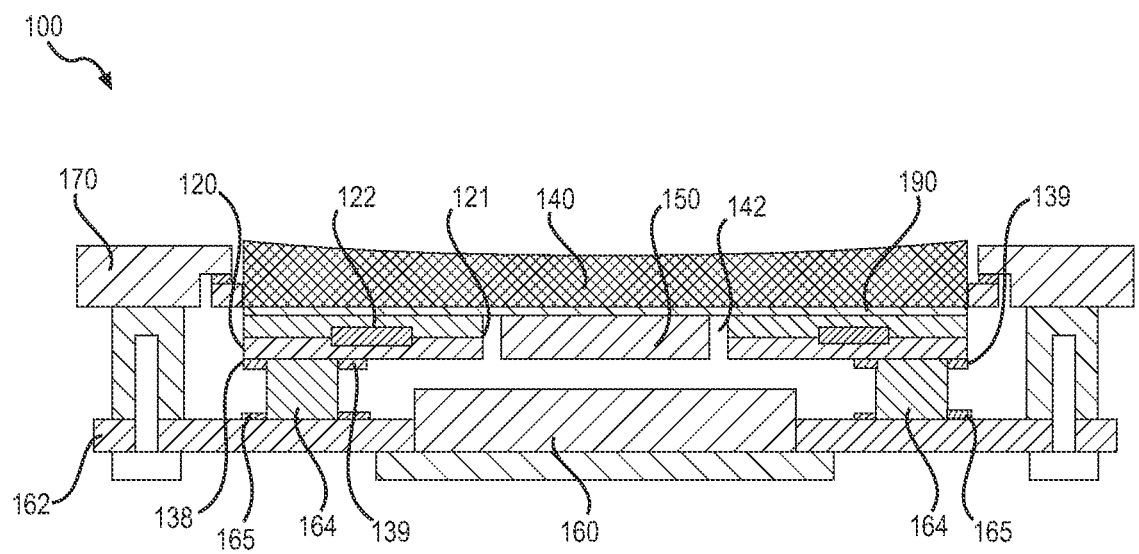
FIG. 7 is a schematic representation of another variation of the system.
Figure 8:
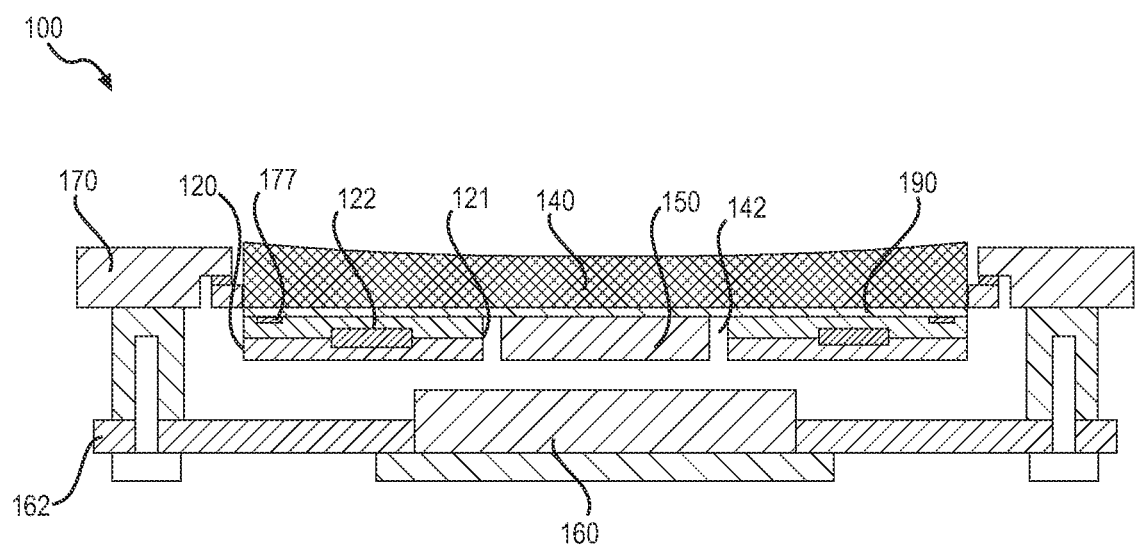
FIG. 8 is a schematic representation of another variation of the system.
Figure 9:
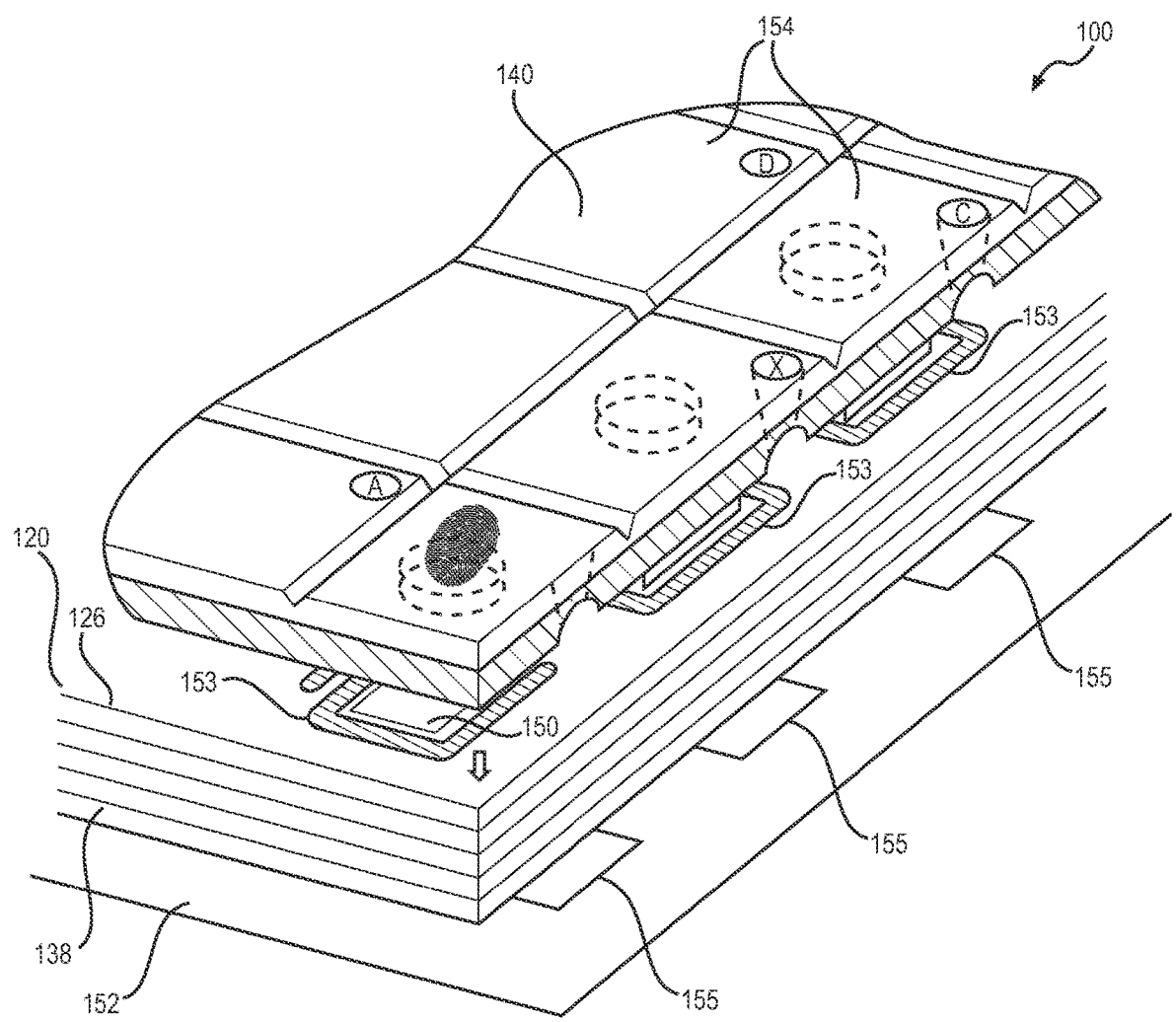
FIG. 9 is a schematic representation of another variation of the system.
Figure 10:
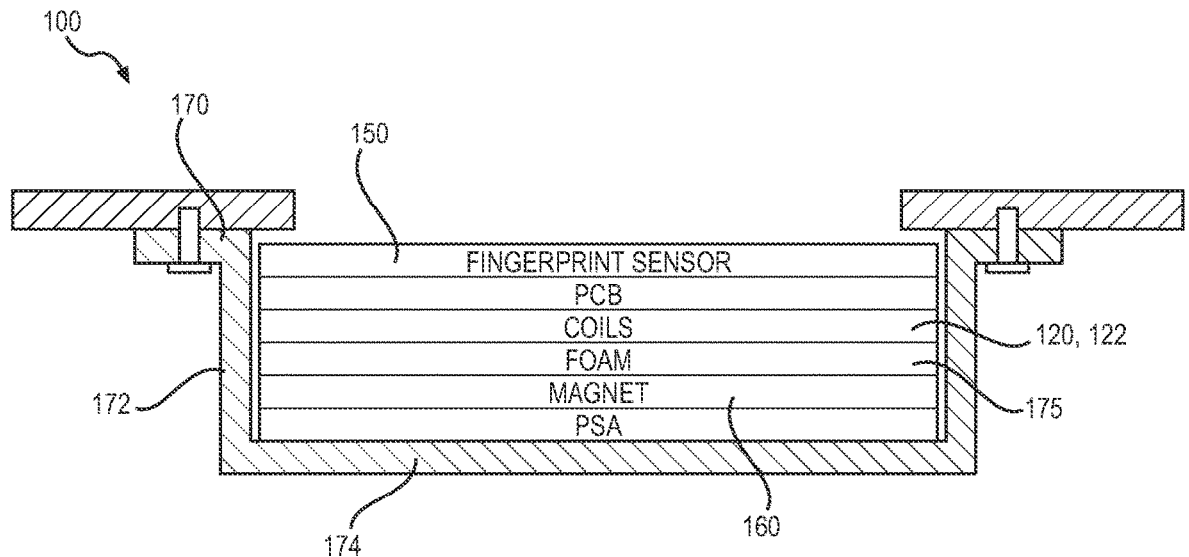
FIG. 10 is a schematic representation of another variation of the system.
Figure 11:
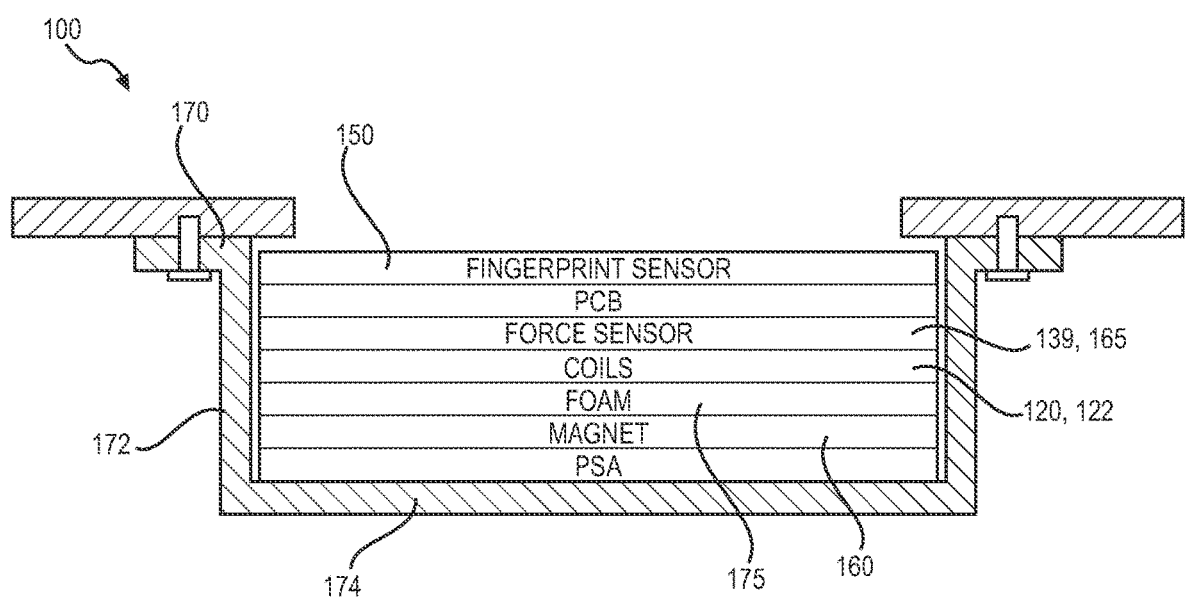
FIG. 11 is a schematic representation of another variation of the system.
Figure 12:
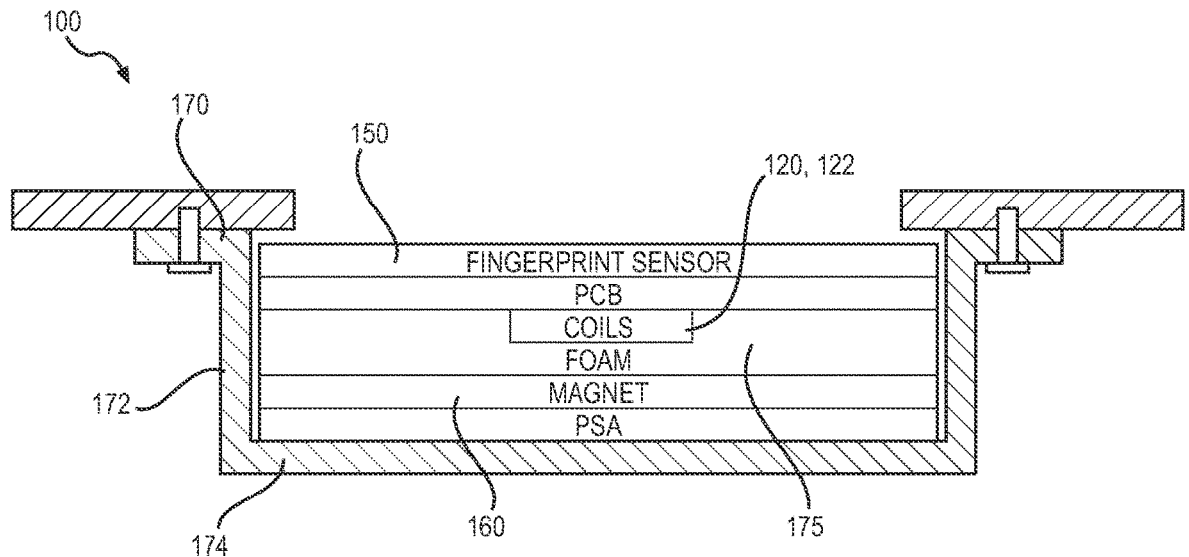
FIG. 12 is a schematic representation of another variation of the system.
Figure 13:
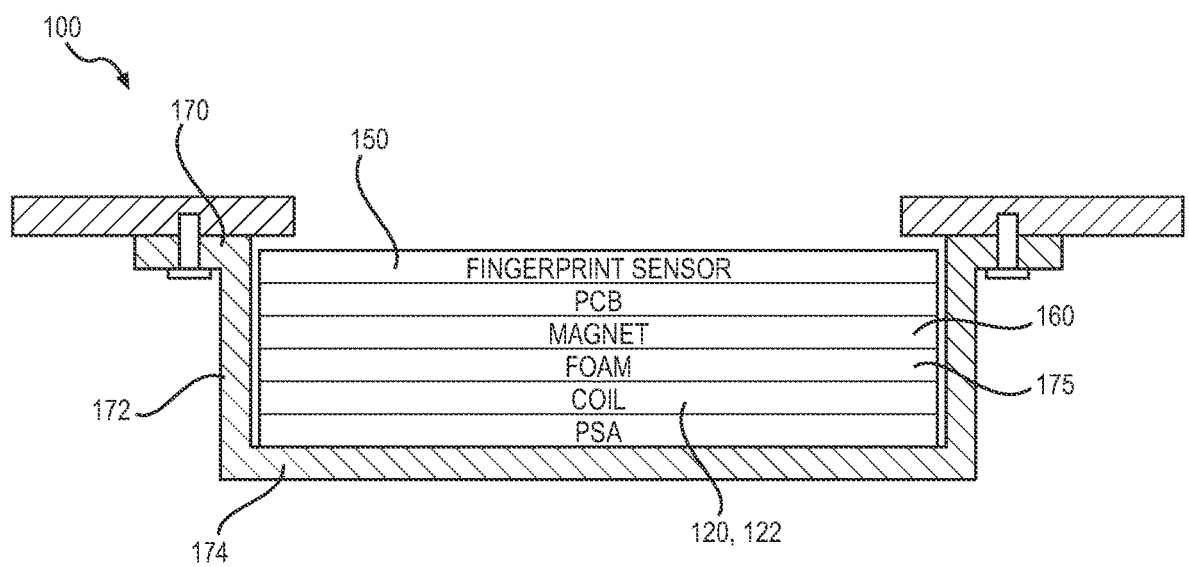
FIG. 13 is a schematic representation of another variation of the system.
Figure 14:
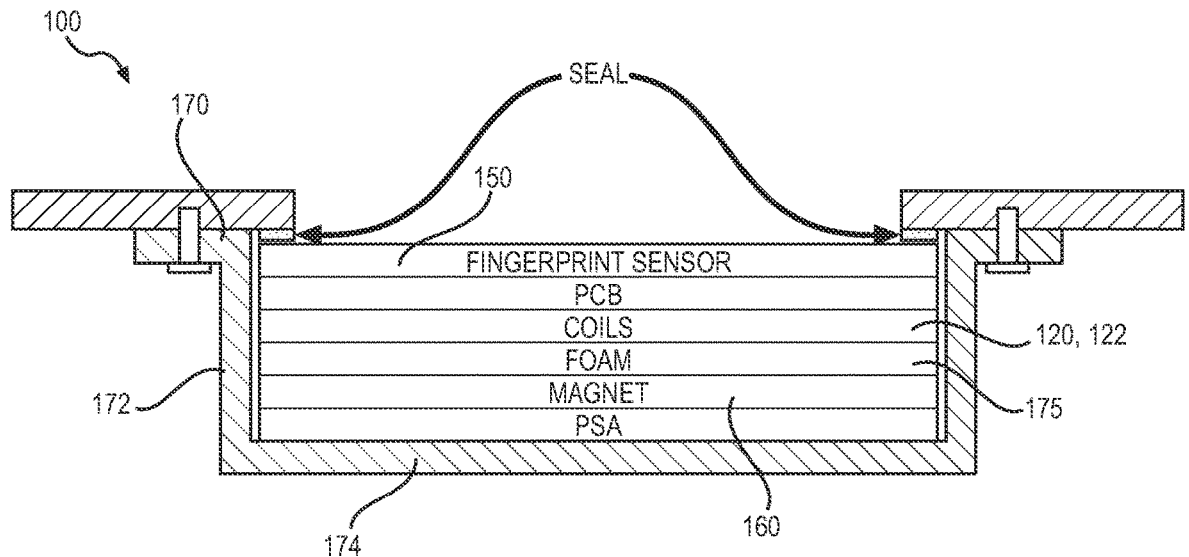
FIG. 14 is a schematic representation of another variation of the system.
Figure 15:
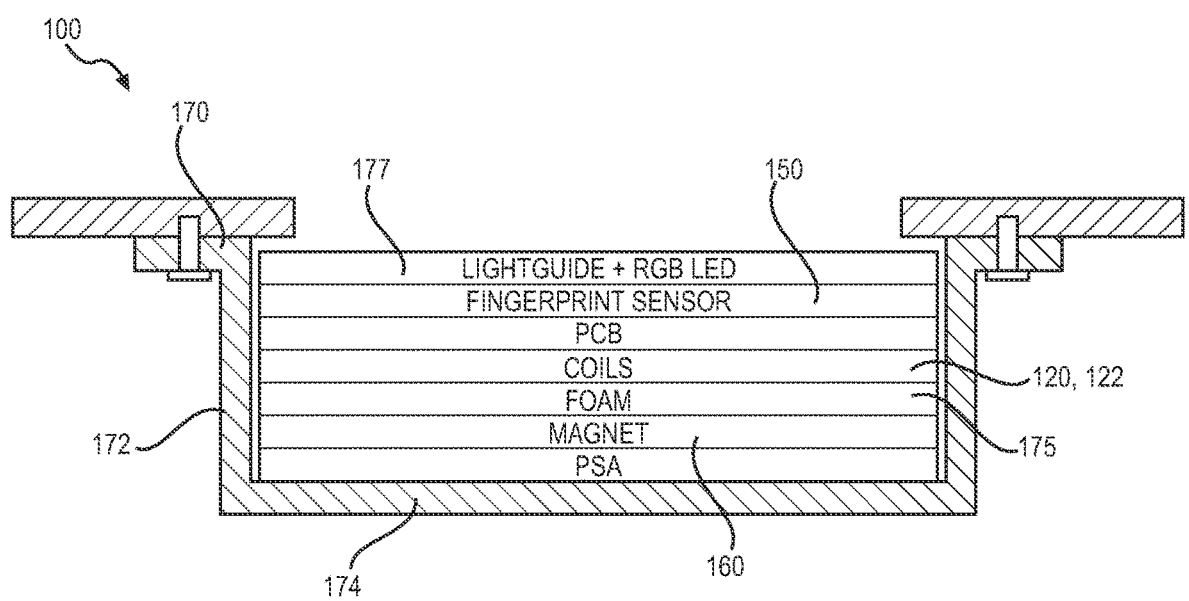
FIG. 15 is a schematic representation of another variation of the system.
Figure 16:
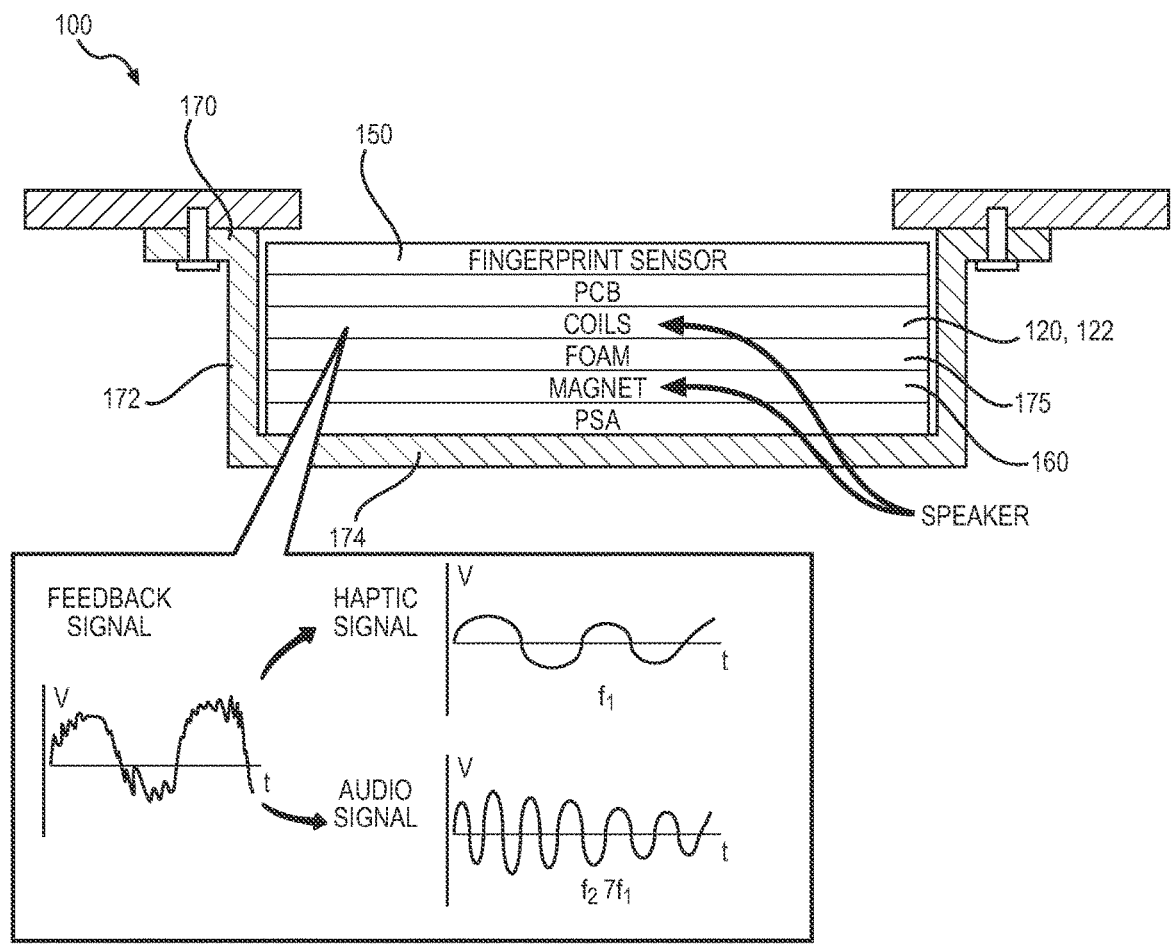
FIG. 16 is a schematic representation of another variation of the system.
Figure 17:
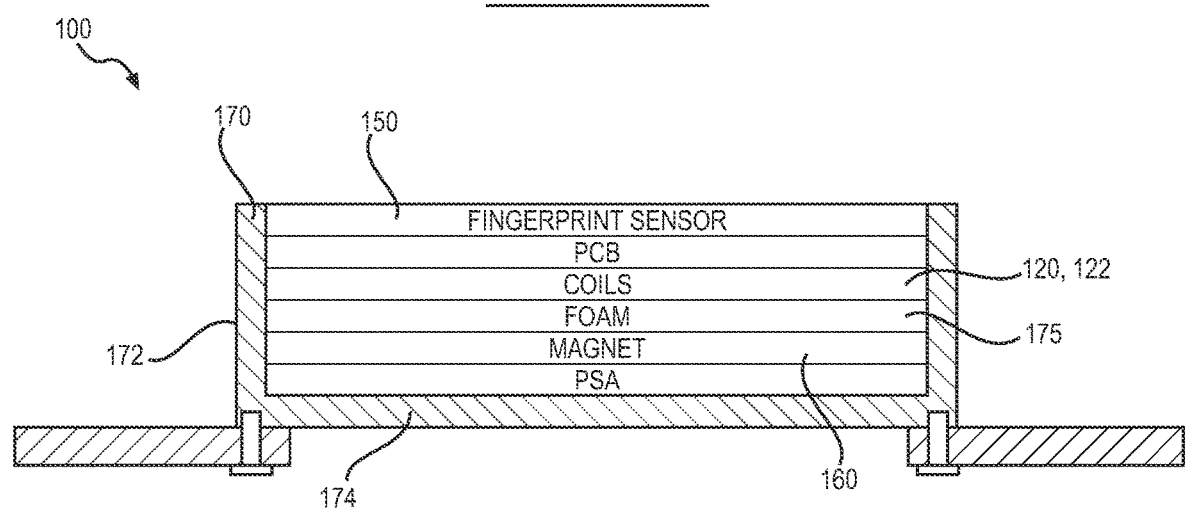
FIG. 17 is a schematic representation of another variation of the system.

In one variation, as shown in FIGS. 1 and 3, the system 100 includes: a substrate 120; a cover layer 140; a fingerprint reader 150; a first magnetic element 160; and a controller 180.

The substrate 120 includes: an aperture 121 extending from a top side to a bottom side of the substrate 120; and a first multi-layer inductor 122 encircling the aperture 121.

The cover layer 140 is: arranged over the substrate 120; and cooperates with the aperture 121 of the substrate 120 to define a housing 142.

The fingerprint reader 150 is: arranged within the housing 142; and configured to permeate through the cover layer 140 and the touch sensor layer 190 to scan a fingerprint applied over the cover layer 140.

The first magnetic element 160: defines a first polarity facing the first multi-layer inductor 122; and is configured to inductively couple the first multi-layer inductor 122 responsive to application of a force on the cover layer 140.

In this variation, the controller 180 is configured to: read a first set of electrical values from the first multi-layer inductor 122; and, at a first time, in response to detecting a first change in electrical value at the first multi-layer inductor 122 based on the first set of electrical values, register a first fingerprint input on the cover layer 140. Additionally, the controller 180 is configured to: read a first set of fingerprint values from the fingerprint reader 150; generate a first fingerprint image based on the first set of fingerprint values; and, in response to the first fingerprint image deviating from a target fingerprint image, trigger a first oscillating voltage across the first multi-layer inductor 122 during a first haptic feedback cycle to induce alternating magnetic coupling between the first multi-layer inductor 122 and the first magnetic element 160 and to oscillate the cover layer 140.

14.1 Controller

Generally, the controller 180 is configured to: read electrical values (e.g., current directions and amplitudes; voltage polarities and amplitudes) from the multi-layer inductor 122; register a fingerprint input at the cover layer 140 responsive to changes in electrical values at the multi-layer inductor 122 (e.g., from baseline "null" current amplitudes); and drive an oscillating voltage across the multi-layer inductor 122 during a haptic feedback cycle responsive to registering the fingerprint input at the cover layer 140.

14.2 Fingerprint Input Detection

In this variation, the system 100 can include a spacer element (e.g., coupon, foam layer 175): interposed between the substrate 120 and the first magnetic element 160; configured to locally compress to enable movement of the first magnetic element 160 toward the multi-layer inductor 122 responsive to application of a force at the cover layer 140; and configured to rebound (or "spring back") to return the substrate 120 to its nominal position over the multi-layer inductor 122 when a force is released from the cover layer 140. Movement of the substrate 120 toward the first magnetic element 160—when a force is applied to the cover layer 140 over the fingerprint reader 150—induces inductive coupling between the first magnetic element 160 and the multi-layer inductor 122, and causes current to flow in a first direction through the inductor, thus generating a voltage of a first polarity across the inductor.

The system 100 can then: detect this current flow and direction through the multi-layer inductor 122 (e.g., via an ammeter connected to the controller 180) and/or detect this voltage and voltage polarity across the multi-layer inductor 122 (e.g., via an integrated or connected analog-to-digital converter) when the cover layer 140 is depressed; and register a fingerprint input—associated with the fingerprint reader 150—such as if the total current through the multi-layer inductor 122, the total current through the multi-layer inductor 122 within a threshold time interval (e.g., 1 milli-second), the peak voltage across the multi-layer inductor 122, or the integral voltages across the multi-layer inductor 122 over the time interval aligns with a first current direction or first voltage polarity and exceeds a threshold fingerprint input value. Upon registering this fingerprint input at the cover layer 140, the controller 180 can: read a set of fingerprint values from the fingerprint reader 150; generate a fingerprint image based on these fingerprint values; and, in response to the fingerprint image deviating from a target fingerprint image, trigger a first oscillating voltage across the multi-layer inductor 122 during a first haptic feedback cycle to induce alternating magnetic coupling between the multi-layer inductor 122 and the first magnetic element 160 and to oscillate the cover layer 140. Alternatively, the controller 180 can, responsive to the fingerprint image matching the target fingerprint image, trigger a second oscillating voltage, different from the first oscillating voltage, across the first multi-layer inductor 122 during a second haptic feedback cycle to induce alternating magnetic coupling between the first multi-layer inductor 122 and the first magnetic element 160 and to oscillate the cover layer 140.

14.2 Inductive Force Sensing

In one implementation, the system 100 can: interpret a force magnitude of a fingerprint input applied on the cover layer 140 based on electrical values read from the multi-layer inductor 122; and trigger oscillating voltage across the multi-layer inductor 122 based on interpreted force magnitudes applied on the cover layer 140 and the fingerprint image derived from the fingerprint reader 150.

In one example, the system 100 includes a controller 180 configured to: access the first set of electrical values, from the first multi-layer inductor 122, representing voltage across the first multi-layer inductor 122; detect the first change in electrical value including a first voltage of a first polarity across the first multi-layer inductor 122 at the first time; and register the first fingerprint input on the cover layer 140 in response to detecting the first voltage of the first polarity across the first inductor. The controller 180 can then: interpret a first force magnitude for the first fingerprint input based on the first voltage of the first polarity; and trigger the oscillating voltage across the first multi-layer inductor 122 during the first haptic feedback cycle in response to the first force magnitude exceeding a target force magnitude and in response to the first fingerprint image deviating from the target fingerprint image.

Therefore, the system 100 can: regularly execute scan cycles for the multi-layer inductor 122 in order to interpret force magnitude applied on the cover layer 140; and conserve power by initializing the fingerprint reader 150 scan cycles responsive to exceeding a target force applied on the cover layer 140.

14.4 Inductive Sensing+Touch Sensor Layer

In one implementation of this variation, the system 100 includes a touch sensor layer 190 interposed between the cover layer 140 and the substrate 120. In this implementation, the touch sensor layer 190 includes a set of drive and sense electrode pairs 196 arranged across the touch sensor layer 190, such as across a top surface of the touch sensor layer 190, or across a top and bottom surface of the touch sensor layer 190. The system 100 can thus: read electrical values from the set of drive and sense electrode pairs 196; and interpret presence of a fingerprint input on the cover layer 140 based on deviations of the electrical values from baseline electrical values.

In one example, the system 100 includes a controller 180 configured to: read a first set of electrical values from the set of drive and sense electrode pairs 196; detect presence of a fingerprint input applied on the cover layer 140 based on deviations of the first set of electrical values from baseline electrical values; and, in response to detecting presence of the fingerprint input on the cover layer 140, read a second set of electrical values from the multi-layer inductor 122. The system 100 can thus: interpret a force magnitude for the fingerprint input applied to the cover layer 140 based on the second set of electrical values; and subsequently read fingerprint values from the fingerprint reader 150 responsive to the force magnitude of the fingerprint input exceeding a target force magnitude.

Therefore, the system 100 can: regularly execute scan cycles for the touch sensor layer 190 to interpret presence of a fingerprint input on the cover layer 140; subsequently read electrical values from the multi-layer inductor 122 in order to interpret force magnitude for the fingerprint input applied on the cover layer 140; and thus conserve power by initializing the fingerprint reader 150 scan cycles responsive to exceeding a target force applied on the cover layer 140.

14.5 Inductive Sensing+Capacitive Force Sensing

In one implementation of this variation, the system 100 includes a substrate 120 including: a top layer facing a bottom surface of the cover layer 140; and a bottom layer 138 arranged below the top layer and including a set of force sense electrodes 139 arranged (e.g., printed) across a bottom surface of the bottom layer 138. In this implementation, the set of force sense electrodes 139 are configured to: capacitively couple a set of force drive electrodes 165 arranged below the substrate 120 (e.g., arranged across a top surface of a baseplate 162 below the substrate 120); and effect capacitance values in response to displacement of the substrate 120 toward the set of force drive electrodes 165. The system 100 can thus: read electrical values from the set of force sense electrodes 139; interpret a force magnitude applied to the cover layer 140 based on the set of electrical values; and, in response to the force magnitude exceeding a target force magnitude, read a second set of electrical values from the fingerprint reader 150.

14.6 Release Detection

As described above, the set of spacer elements 164 are configured to elastically deform and return the substrate 120 to its nominal position when force applied on the cover layer 140 is released. Accordingly, the first magnetic element 160 arranged below the substrate 120 can induce current flow in a second, opposite direction, through the multi-layer inductor 122 as the substrate 120 moves away from the first magnetic element 160 and back toward its nominal position when a force on the cover layer 140 is released.

For example, the system 100 can include a spacer element (e.g., coupon, foam layer 175): interposed between the substrate 120 and the first magnetic element 160; configured to locally compress to enable movement of the first magnetic element 160 toward the multi-layer inductor 122 responsive to application of a force at the cover layer 140; and configured to rebound (or "spring back") to return the substrate 120 to its nominal position over the multi-layer inductor 122 when a force is released from the cover layer 140. Movement of the substrate 120 away from the first magnetic element 160—when a force previously applied to the cover layer 140 is released—induces inductive coupling between the first magnetic element 160 and the multi-layer inductor 122 and induces current flow in a second, opposite direction through the multi-layer inductor 122, thus generating a voltage of a second polarity across the inductor.

The controller 180 can: detect this current flow and direction through the multi-layer inductor 122 and/or detect this voltage and voltage polarity across the multi-layer inductor 122 when the force on the cover layer 140 is released; and then register a fingerprint release event and/or completion of a keystroke, such as if the total current through the multi-layer inductor 122, the total current through the multi-layer inductor 122 within a threshold time interval (e.g., 1 millisecond), the peak voltage across the multi-layer inductor 122, or the integral of voltages across the multi-layer inductor 122 over the time interval aligns with a second current direction or second voltage polarity and exceeds a threshold release value (e.g., less than the input threshold value described above). Upon registering this input release at the cover layer 140, the controller 180 can trigger a second oscillating voltage, different from the first oscillating voltage (e.g., less than the first oscillating voltage), across the first multi-layer inductor 122 during a second haptic feedback cycle in response to registering release of the first fingerprint input from the cover layer 140.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A fingerprint sensor system comprising:
   a substrate;
   a first multi-layer inductor arranged across a set of layers of the substrate;
   a cover layer arranged over the substrate defining a touch sensor surface;
   a fingerprint reader:
      arranged within the substrate below the cover layer, the first multi-layer inductor encircling the fingerprint reader within the substrate; and
      configured to permeate through the cover layer to scan a fingerprint applied over the cover layer; and
   a first magnetic element:
      defining a first polarity facing the first multi-layer inductor; and
      configured to inductively couple the first multi-layer inductor responsive to application of a touch input on the touch sensor surface.

2. The system of claim 1, further comprising a controller configured to:

read a first set of electrical values from the first multi-layer inductor; and
in response to detecting a first touch input on the touch sensor surface based on the first set of electrical values:
read a first set of fingerprint values from the fingerprint reader;
generate a first fingerprint image based on the first set of fingerprint values; and
in response to the first fingerprint image deviating from a target fingerprint image, trigger a first oscillating voltage across the first multi-layer inductor during a first haptic feedback cycle to induce alternating magnetic coupling between the first multi-layer inductor and the first magnetic element and oscillate the cover layer.

3. The system of claim 2, wherein the controller is configured to, in response to detecting the first change in electrical value at the first multi-layer inductor based on the first set of electrical values:
read a first set of capacitance values from the fingerprint reader for the touch input applied on the cover layer;
interpret the touch input as a fingerprint input;
interpret a first set of ridges for the fingerprint input based on the first set of capacitance values;
interpret a first set of valleys for the fingerprint input based on the first set of capacitance values; and
compile the first set of ridges and the first set of valleys into the first fingerprint image.

4. The system of claim 1, further comprising a controller configured to, in response to detecting the first change in electrical value at the first multi-layer inductor based on the first set of electrical values:
read a first set of fingerprint values from the fingerprint reader;
generate a first fingerprint image based on the first set of fingerprint values; and
in response to the first fingerprint image matching a target fingerprint image, trigger a first oscillating voltage across the first multi-layer inductor during a first haptic feedback cycle to induce alternating magnetic coupling between the first multi-layer inductor and the first magnetic element and oscillate the cover layer.

5. The system of claim 1:
wherein the substrate comprises a bottom layer comprising a set of sense electrodes;
further comprising:
a baseplate comprising a set of drive electrodes:
arranged across the top surface of the baseplate;
arranged in alignment with the set of sense electrodes at the bottom layer of the substrate; and
configured to capacitively couple the set of sense electrodes to form a set of capacitive force sensors and effect capacitance values of the set of sense electrodes responsive to displacement of the substrate toward the baseplate; and
a controller configured to, in response to detecting a first change in electrical value at the first multi-layer inductor based on a first set of electrical values output by the multi-layer inductor:
read a second set of electrical values from the set of capacitive force sensors;
detect presence of the touch input on the cover layer;
interpret a first force magnitude for the touch input based on the second set of electrical values; and
in response to the first force magnitude exceeding a target force magnitude, register the touch input applied to the cover layer.

6. The system of claim 1:
wherein the substrate comprises:
a first layer comprising:
a first cutout; and
a first spiral trace coiled in a first direction about the first cutout; and
a second layer comprising:
a second cutout arranged in alignment with the first cutout to define an aperture of the substrate; and
a second spiral trace:
coiled in a second direction, opposite the first direction, about the second cutout;
electrically coupled to the first spiral trace; and
cooperating with the first spiral trace to form the first multi-layer inductor; and
wherein the fingerprint reader is arranged proximal the aperture of the substrate.

7. The system of claim 1, further comprising a controller configured to:
access a first set of electrical values from the first multi-layer inductor, the first set of electrical values representing voltage across the first multi-layer inductor;
detect a first change in electrical value comprising a first voltage of a first polarity across the first multi-layer inductor;
register the touch input on the cover layer in response to detecting the first voltage of the first polarity across the first inductor at a first time;
interpret a first force magnitude for the touch input based on the first voltage of the first polarity;
trigger a first oscillating voltage across the first multi-layer inductor during a first haptic feedback cycle in response to the first force magnitude exceeding a target force magnitude and in response to a first fingerprint input deviating from a target fingerprint input;
detect a second voltage of a second polarity, opposite the first polarity, across the first multi-layer inductor at a second time succeeding the first time;
register release of the touch input from the cover layer in response to detecting the second voltage at the second polarity across the first multi-layer inductor; and
trigger a second oscillating voltage, different from the first oscillating voltage, across the first multi-layer inductor during a second haptic feedback cycle in response to registering release of the touch input from the cover layer.

8. The system of claim 1:
further comprising a baseplate arranged below the substrate;
wherein the first magnetic element is coupled to the baseplate and faces the first multi-layer inductor; and
further comprising a set of spacer elements, each spacer element in the set of spacer elements:
coupled to a top surface of the baseplate;
supporting the substrate over the baseplate; and
configured to:
compress during application of a force on the cover layer; and
yield to oscillation of the substrate responsive to oscillating voltage across the first multi-layer inductor during a haptic feedback cycle.

9. The system of claim 8:
wherein the substrate comprises a set of sense electrodes arranged proximal the set of spacer elements;
wherein the baseplate comprises a set of drive electrodes:
arranged across the top surface of the baseplate and in alignment with the set of sense electrodes; and configured to capacitively couple the set of sense electrodes to form a set of capacitive force sensors and effect capacitance values of the set of sense electrodes responsive to displacement of the substrate toward the baseplate; and further comprising a controller configured to, in response to detecting a first change in electrical value at the first multi-layer inductor:
- read a second set of electrical values from the set of capacitive force sensors;
- interpret a first force magnitude for the touch input based on the second set of electrical values; and
- in response to the first force magnitude exceeding a target force magnitude, register the touch input applied to the cover layer.

10. The system of claim 1:

further comprising a touch sensor layer:
- interposed between the substrate and the cover layer; and
- comprising an array of drive and sense electrode pairs;

wherein the fingerprint reader is bonded to a bottom surface of the touch sensor layer; and further comprising a controller configured to:
- read a first electrical value from the array of drive and sense electrode pairs;
- detect presence of the touch input on the cover layer based on the first electrical value deviating from a baseline electrical value; and
- in response to detecting presence of the touch input on the cover layer, read a first set of electrical values from the first multi-layer inductor.

11. The system of claim 10, wherein the controller is further configured to, in response to detecting the touch input on the touch sensor surface, based on the first set of electrical values:
- read a first set of fingerprint values from the fingerprint reader; and
- in response to the first set of fingerprint values deviating from a target set of fingerprint values, trigger a first oscillating voltage across the first multi-layer inductor during a first haptic feedback cycle to induce alternating magnetic coupling between the first multi-layer inductor and the first magnetic element and oscillate the cover layer.

12. The system of claim 1:

further comprising a keyboard chassis;

wherein the substrate:
- is arranged within the keyboard chassis; and
- comprises an array of multi-layer inductors comprising the first multi-layer inductor;

wherein the cover layer defines an array of key locations over the array of multi-layer inductors, the array of key locations comprising a fingerprint key location arranged over the first multi-layer inductor; and further comprising an array of magnetic elements arranged on the keyboard chassis and facing the array of multi-layer inductors at the array of key locations, the array of magnetic elements comprising the first magnetic element.

13. The system of claim 1:

wherein the first multi-layer inductor cooperates with the first magnetic element to form a speaker configured to broadcast audible feedback responsive to magnetic coupling between the first multi-layer inductor and the first magnetic element; and further comprising a controller configured to:
- trigger an oscillating voltage at a first frequency concurrent the first oscillating voltage during a first haptic feedback cycle to induce alternating magnetic coupling between the first multi-layer inductor and the first magnetic element and broadcast an audible feedback tone from the speaker.

\* \* \* \* \*